PHOTOMICROGRAPHS OF PRECIPITATES OBTAINED BY AMMONIATION
TO pH 8.5 OF SUPERPHOSPHORIC ACID AT ATMOSPHERIC PRESSURE

100 ⊢——⊣ MICRONS

READILY FILTERABLE
PRECIPITATE, ROD CRYSTALS
OF $(NH_4)_4P_2O_7 \cdot H_2O$ AND
PLATES OF $(NH_4)_2HPO_4$.
AMMONIATED AT 15° TO 20°C.

POORLY FILTERABLE
PRECIPITATE, SMALL PLATE
CRYSTALS OF $(NH_4)_4P_2O_7$
AND PRISMS OF $(NH_4)_2HPO_4$.
AMMONIATED AT 35° TO 70°C.

United States Patent Office
3,484,192
Patented Dec. 16, 1969

3,484,192
AMMONIUM POLYPHOSPHATE PRODUCED AT ATMOSPHERIC PRESSURE
Thad D. Farr, Sheffield, and Henry K. Walters, Jr., and Julius D. Fleming, Florence, Ala., assignors to Tennessee Valley Authority, a corporation
Filed Aug. 24, 1967, Ser. No. 663,171
Int. Cl. C01b 25/28, 25/00
U.S. Cl. 23—106                                            5 Claims

ABSTRACT OF THE DISCLOSURE

Alternate processes for the ammoniation of superphosphoric acid of variable $P_2O_5$ content, where multiple reaction steps are employed in an aqueous system to make high-analysis solid, liquid, or fluid suspension products with good physical properties. The acid is ammoniated and hydrolyzed under various operating conditions of temperature (about 15° to 200° C.), pH (maximum about 8.5), amount of water and reaction time to control the phosphate species in the products.

---

Our invention relates to an improved process for the production of high-analysis ammonium polyphosphate salts and solutions and more particularly to the preparation of ammonium acyclic polyphosphate salts and solutions by the ammoniation of superphosphoric acid at atmospheric pressure.

The term "superphosphoric acid" used in the specification and claims is defined as a mixture of ortho-, pyro-, and higher condensed phosphoric acids with the general formula $H_{n+2}P_nO_{3n+1}$. The distribution of the acid species varies with the $P_2O_5$ content of the superphosphoric acid. The Canadian Journal of Chemistry, vol. 34 (1956), p. 790, shows that superphosphoric acid in the range 69.81 to 84.95 percent $P_2O_5$ contains the following proportions of ortho-, pyro-, and higher condensed acyclic polyphosphoric acids, expressed as percent of total phosphorus.

|  | Percent |
|---|---|
| Ortho- | 97.85 to 2.32 |
| Pyro- | 2.15 to 49.30 |
| Tripoly- | 0.00 to 24.98 |
| Tetrapoly- | 0.00 to 16.99 |
| Pentapoly- | 0.00 to 12.64 |
| Hexapoly- | 0.00 to 9.75 |
| Heptapoly- | 0.00 to 8.63 |
| Octapoly- | 0.00 to 7.85 |
| Nonapoly- | 0.00 to 6.03 |
| Higher polymers | 0.00 to 29.41 |

Acids of the above type are available from commercial sources of electric-furnace superphosphoric acid plants and may be produced with $P_2O_5$ contents ranging from about 74 to about 83 percent by a process described in U.S. Patent 3,015,540, Striplin.

Our invention is especially valuable in the production of solid and liquid ammonium polyphosphates by the atmospheric ammoniation of superphosphoric acid of any practical $P_2O_5$ content higher than about 70 percent. Either electric-furnace acid or concentrated wet-process acid can be used. If concentrated wet-process phosphoric acids are desired, they can be produced by concentrating ordinary merchant-grade wet-process phosphoric acid containing approximately 54 weight percent $P_2O_5$ and also containing incidental metallic impurities ranging from about 1 to 10 percent by a dehydration process to remove water from the merchant-grade wet-process phosphoric acid and increase its $P_2O_5$ content up into the wet acid super range of about 60 percent to about 80 percent $P_2O_5$ by a process such as that described in the copending application Ser. No. 835,377, Getsinger, assigned to the assignee of the present invention, and also described in U.S. Patent 3,192,013. When using such wet-process phosphoric acid, the distribution of the acid species therein has been observed to be somewhat different from that which would result if highly concentrated substantially pure furnace acid were used.

Heretofore a method for the production of ammonium polyphosphate has been described in U.S. Patents 3,171,-733 and 3,228,752, Hignett et al. In this prior process, superphosphoric acid, either wet-process or electric-furnace type, is treated with gaseous ammonia in a reactor under a pressure of about 25 to about 1000 p.s.i.g. and a temperature of 365° to 450° F., the molten material is discharged from the reactor and is granulated by mixing with recycle fines in a pugmill, and the granules are cooled and then screened to separate particles of the desired size for product. The products had compositions ranging from 12.9 to 18.3 percent N and 59.2 to 64.2 percent $P_2O_5$, which corresponds to a degree of ammoniation ranging from 4.9 to 7.5 pounds $NH_3$ per unit (20 pounds) $P_2O_5$. The product is composed of two major phases, monoammonium orthophosphate and triammonium pyrophosphate, and a minor phase diammonium pyrophosphate; the phosphate is divided about equally between ortho and non-ortho forms. Some of the products from this pressure process, however, have had some outstanding disadvantages. It has a relatively low degree of ammoniation as compared to 9.6 pounds $NH_3$ per unt $P_2O_5$ in diammonium orthophosphate or in tetraammonium pyrophosphate. Another disadvantage is that it will cake in storage unless conditioned; the caking charactertistics have been attributed to the instability of one of its major phases.

Another method for preparing solid ammonium phosphates of unspecified distribution of phosphate species by ammoniating concentrated wet-process orthophosphoric acid ($P_2O_5$ content between 68.6 and 80 percent) at 70° C. to 225° C. to provide at least 0.14 part N per part P is described in U.S. Patents 3,241,946 and 3,243,279, D. C. Young. Young states: "The exact nature of the ammonium phosphate products is not known with certainty. It is believed, however, that the major proportion of the product is a mixture of ammonium orthophosphates and ammonium polyphosphates with the presence of some P-N bonds, e.g., phosphoamido and phosphoimido compounds." Young does not specify how acid concentration, temperature, pH, and water content affect the distribution of phosphate species in such products, whereas, in the present application we do specify and give examples of the effects of acid concentration, temperature, pH, and water content on the distribution of phosphate species in the solid products obtained. Furthermore, Young does not teach, as we do, how these process variables may be controlled to obtain solid products with a high degree of ammoniation and with a desirable combination of orthophosphate and condensed phosphates.

It is therefore an object of the present invention to provide a process wherein superphosphoric acid containing more than about 74 percent $P_2O_5$ is treated with ammonia and water at atmospheric pressure to prepare an intermediate aqueous slurry of ammonium phosphates at pH about 8 which is filtered or centrifuged to yield (1) a solution phase that is recycled to first state, and (2) a moist solid phase that is then granulated and dried to produce final granular products which contain all the $P_2O_5$ that was in the starting acid, which contain mostly diammonium ortho- and tetraammonium pyrophosphates, and which have good handling and storage properties.

Another object of the present invention is to provide such process to produce both granular ammonium polyphosphate and a concentrated solution with each product containing about half the $P_2O_5$ that was in the starting acid, with (1) the solid phase having a high ratio of N to $P_2O_5$ and containing chiefly diammonium ortho- and tetraammonium pyrophosphates, and which has good handling and storage properties; and (2) the untreated solution phase having a high total content of N and $P_2O_5$.

Another object of the present invention is to provide such solid and liquid phases, but in which the separated liquid phase is treated with electric-furnace or wet-process acids to adjust its $P_2O_5$ content and to lower its pH.

Another object of the present invention is to provide such process to produce such solid and liquid phases, but in which the separated liquid phase is treated with superphosphoric acid and anhydrous ammonia to form a more concentrated solution of N and $P_2O_5$, and which does not precipitate at storage temperature, such as 0° C.

A further object of the present invention is to provide such process to produce such solid and liquid phases, but in which a significant portion of the $P_2O_5$ present in the acid is precipitated at various intermediate pH's and removed as ammonium ortho- and pyrophosphates in various proportions, and the resulting solution phase is then ammoniated further to higher pH's to precipitate mostly tetraammonium pyrophosphate and diammonium orthophosphate.

Another object of the present invention is to provide such process wherein superphosphoric acids containing $P_2O_5$ in the range of about 70 to about 80 percent are treated with ammonia and water at atmospheric pressure to prepare intermediate aqueous slurries at pH about 8 that are granulated with recycle and dried to produce final granular products which contain all the $P_2O_5$ that was in the starting acid, which have relatively high ratios of N to $P_2O_5$, which contain mostly ammonium ortho-pyro, and tripolyphosphates, and which have good handling and storage properties.

Another object of the present invention is to provide a process wherein superphosphoric acid containing more than about 80 percent $P_2O_5$ is ammoniated and hydrolyzed under specified conditions to prepare an intermediate slurry at pH about 8 that is granulated with recycle and dried to produce final granular products which contain all the $P_2O_5$ that was in the starting acid, which have relatively high ratios of N to $P_2O_5$, which consist mostly of ammonium ortho-, pyro-, and tripolyphosphates, and which have good handling and storage properties.

Another object of the present invention is to provide such process wherein superphosphoric acids containing more than about 70 percent $P_2O_5$ are treated with ammonia and water under specified conditions to prepare substantially anhydrous melts or solidified products at pH about 6 with pyrophosphate contents significantly higher than that in the starting acid, which are then processed further under specified conditions to produce granular solids, concentrated aqueous solutions, or suspensions.

Another object of the present invention is to provide such processes to prepare intermediate melts at pH about 6 or to prepare intermediate slurries at pH about 8, as variously described above, which are then granulated and dried under specified conditions favoring hydrolysis of that portion of the $P_2O_5$ present as species more condensed than pyrophosphate.

A still further object of the present invention is to provide such processes for the production of salts and/or solutions from electric-furnace superphosphoric acids for use as fertilizers, or these products may preferably be considered as high-purity intermediates for special use such as inorganic builders in detergent formulations, as reagent chemicals, as medicinal and dental preparations, etc.

Another object of the present invention is to provide a process whereby impure superphosphoric acids such as concentrated wet-process phosphoric acids are ammoniated at atmospheric pressure to produce high-analysis products that may preferably be used as a fertilizer.

Still another object of the present invention is to provide such processes in which the ammoniation of superphosphoric acids is carried out economically at atmospheric pressure with conventional equipment.

Still further and more general objects and advantages of the present invention will appear from the more detailed description set forth, it being understood, however, that this more detailed description is given by way of illustration and explanation only and not by way of limitation, since various changes therein may be made by those skilled in the art without departing from the spirit and scope of the present invention.

In carrying out the objects of our invention in but several preferred forms thereof, we provide for the ammoniation of superphosphoric acids at atmospheric pressure to proceed in one or more stages and the resulting intermediate slurries or melts are subsequently treated in various ways to produce (1) granules of ammonium polyphosphates which contain all the $P_2O_5$ that was originally present in the starting acid, (2) granules of ammonium principles of our process in modification I thereof, which may contain about 50 percent of the $P_2O_5$ that was originally present in the starting acid, (3) solutions which contain all the $P_2O_5$ that was originally present in the starting acid, or (4) suspensions which contain all the $P_2O_5$ that was originally present in the starting acid. The number of processing steps depends on the kind and composition of the superphospheric acid that is used, and by the product that is desired, as will be disclosed in the subsequent detailed description.

Our inventioin, together with further objects and advantages thereof will be better understood from a consideration of the following descriptions taken in connection with the accompanying drawings in which.

Figure 3:
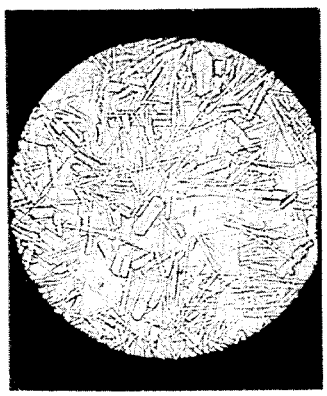
Figure 3:
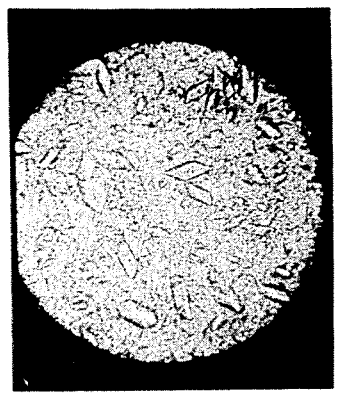

FIGURE 3 is a depiction of what is found in photomicrographs showing the relationship between the filterability of the slurries formed at high pH's and the temperature at which the precipitation of the ammonium phosphate occurs and illustrates that the precipitates which were formed at temperatures lower than about 20° C. exhibited quite satisfactory filtering characteristics, whereas the precipitates which were formed at temperatures above about 35° C. exhibited rather poor filtering characteristics.

Figure 4:
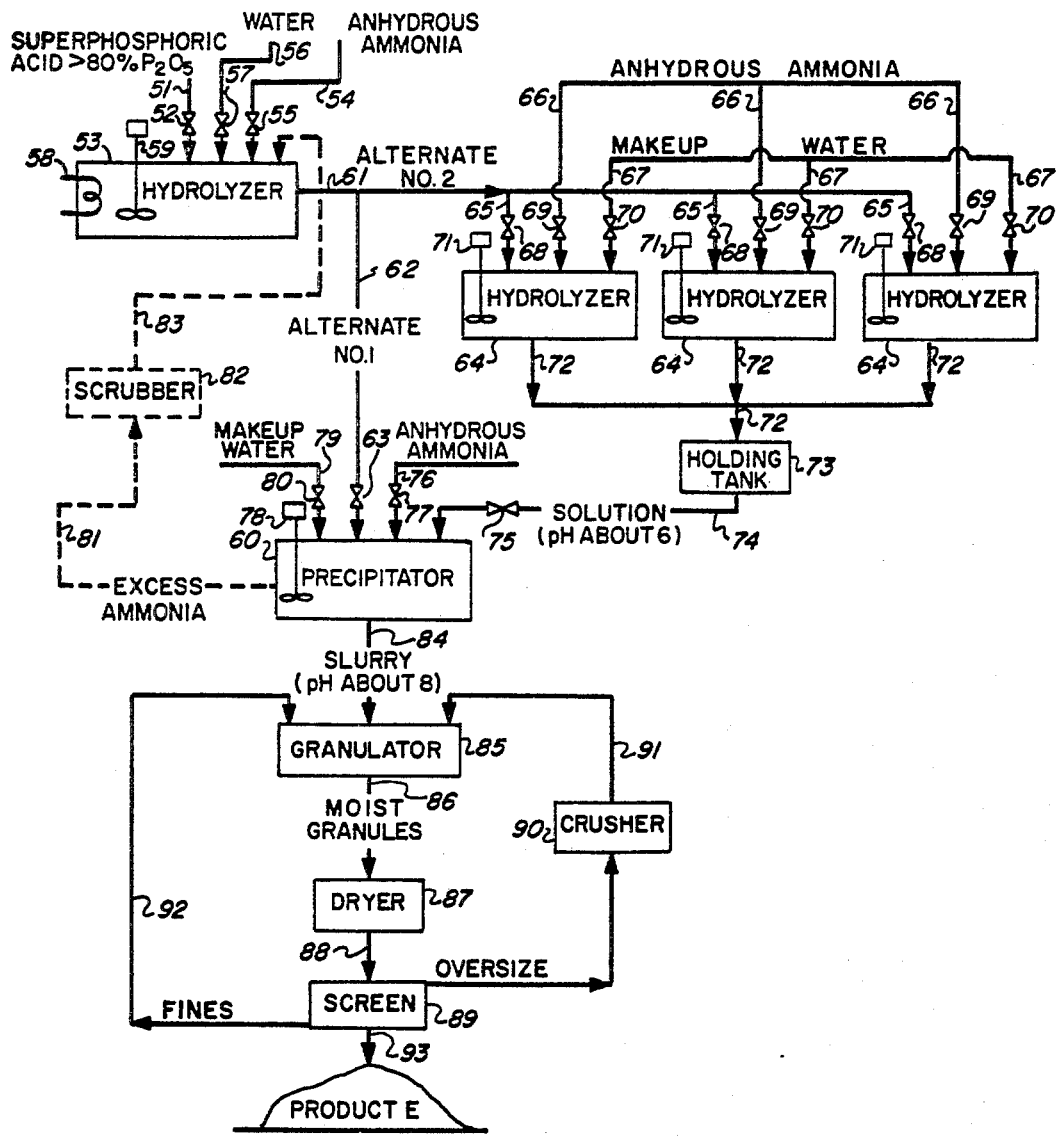

FIGURE 4 is a flowsheet generally illustrating the principles of two alternate procedures of our controlled hydrolysis process in modification II thereof, which results ultimately in the production of the desired high-analysis granular ammonium polyphosphates by the atmospheric-pressure ammoniation of super phosphoric acid preferably containing more than about 80 percent $P_2O_5$.

Figure 5:
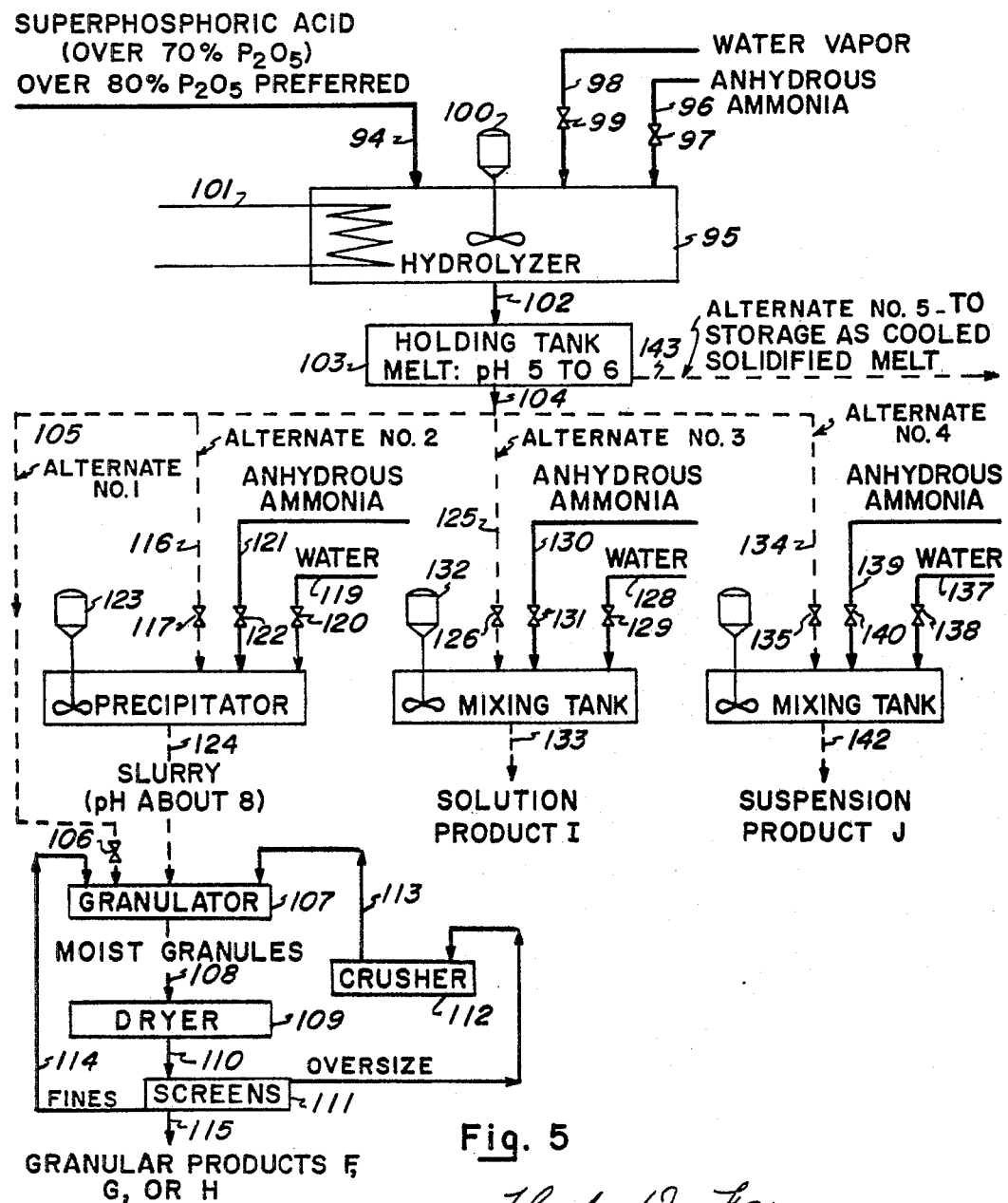

FIGURE 5 is a flowsheet generally illustrating the principles of other alternative procedures of our controlled hydrolysis process in modification II thereof, which results ultimately in the production of the desired high-analysis granular ammonium polyphosphates, solutions, or suspensions by the atmospheric pressure ammoniation of superphosphoric acid preferably containing more than about 80 percent $P_2O_5$.

MODIFICATION I—FIGURE 2

Figure 1:
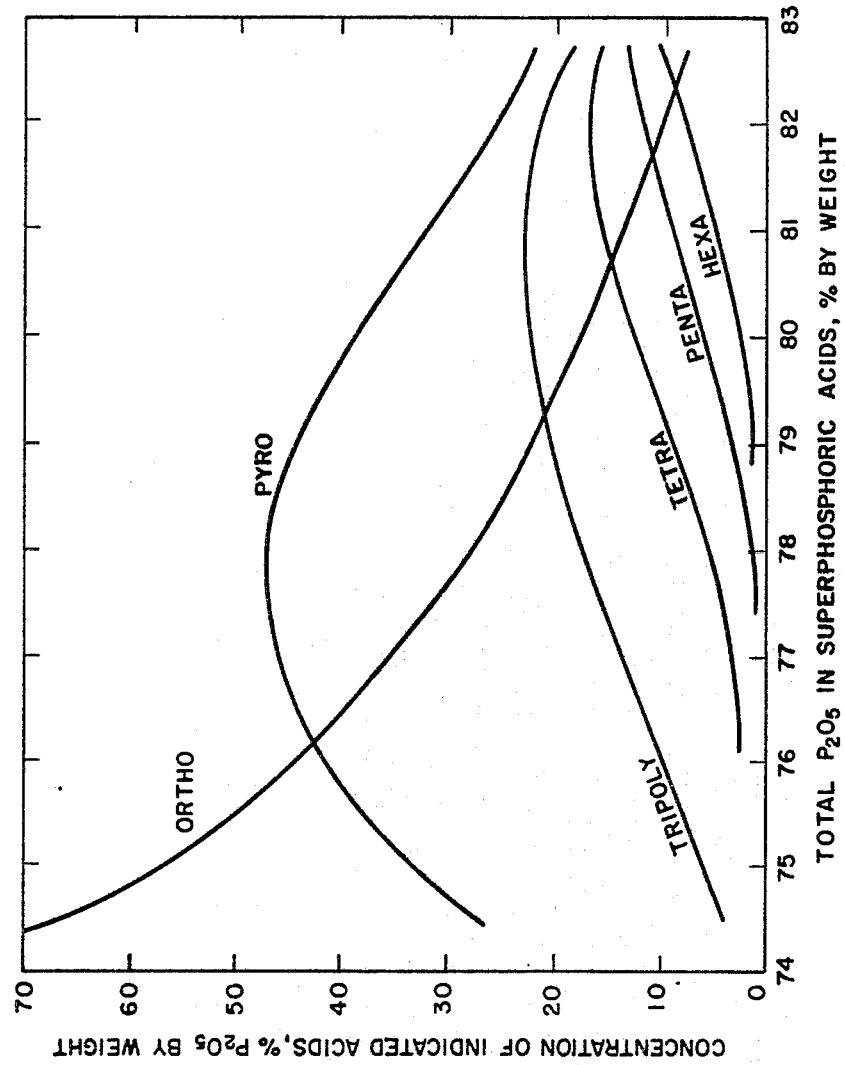
FIGURE 1 is graphical illustration showing the distribution of the principal acid species in commercially avialable electric-furnace superphosphoric acids which were used in the development of our process.
Figure 2:
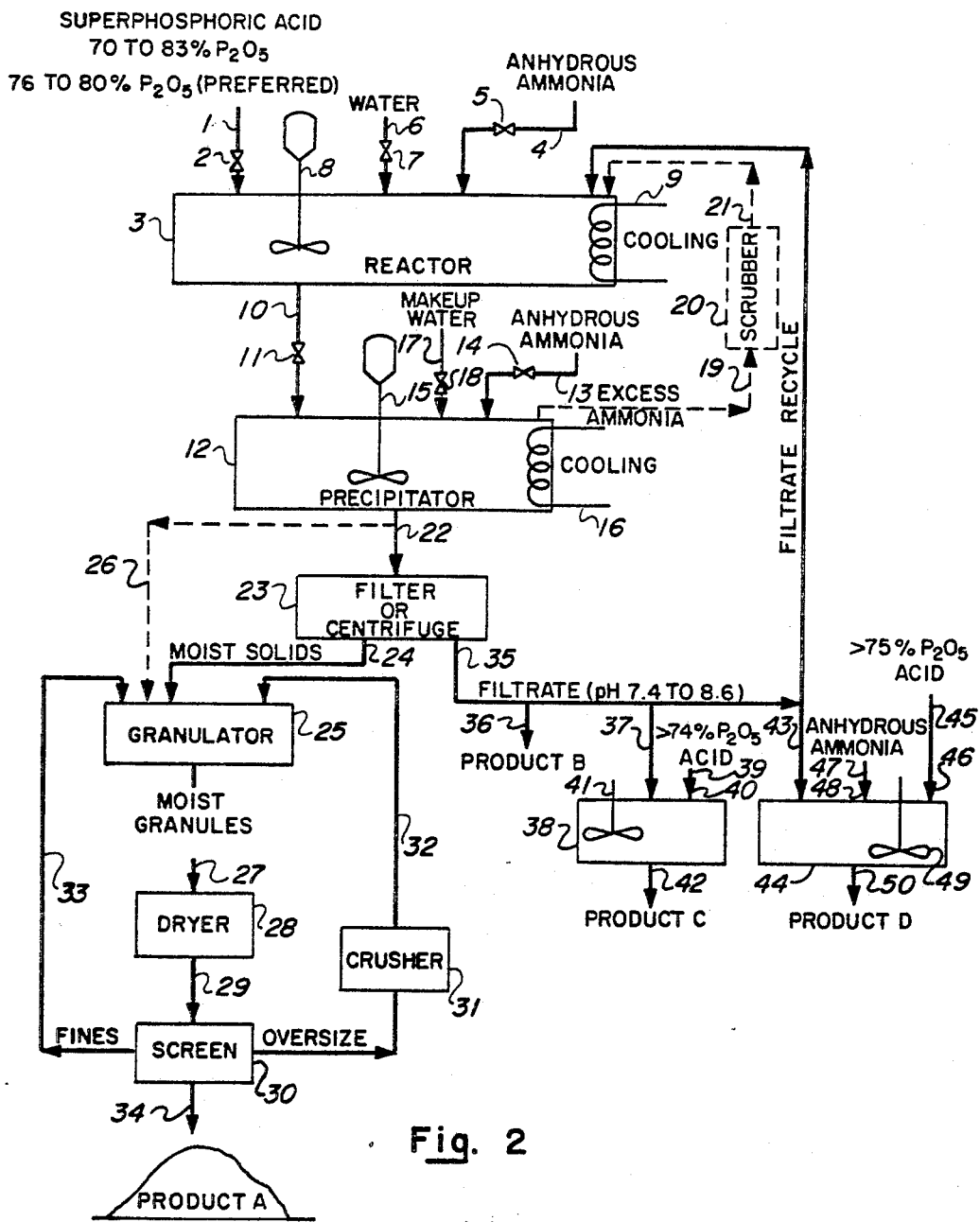
FIGURE 2 is a flowsheet generally illustrating the principles of our process in modification I thereof, which results ultimately in the production of the desired high-analysis granular ammonium polyphosphates and solutions by the atmospheric-pressure ammoniation of superphosphoric acid preferably containing less than about 80 percent $P_2O_5$.

Referring now more specifically to FIGURE 2, in one modification of our process for the preparation of ammonium polyphosphates by the atmospheric ammoniation of superphosphoric acids, superphosphoric acid from a source not shown is fed through line 1 and any suitable means 2 for controlling the rate of flow into a reaction vessel 3. Anhydrous ammonia from a source not shown is fed into vessel 3 through line 4 and means 5 for controlling the rate of flow. Water from a source not shown is fed into vessel 3 through line 6 and means 7 for controlling the rate of flow. Vessel 3 is equipped with a pH meter not shown and a motor-driven agitator 8 running at such speed as to obtain rapid and intimate mixing of acid, water, and ammonia. The three reactants are added simultaneously and at such rates as to form an intermediate solution with pH in the range from about 5 to about 7 and which will contain more than about 33 weight percent total ($N+P_2O_5$). Vessel 3 is equipped also with cooling coils 9 to control the temperature of the solution in the temperature rang of about 50° to about 80° C. Under these conditions, hydrolysis of the non-ortho species in the starting acid is minimized and the distribution of the phosphate species in the solution is similar to that in the acid. We prefer to introduce the superphosphoric acid and water at fixed rates according to the capacity of the equipment and to vary the rate of introduction of anhydrous ammonia as may be necessary to maintain the desired pH of the resultant solution.

The solution is discharged from reaction vessel 3 through line 10 and any suitable means 11 for controlling the rate of flow to precipitation vessel 12. Anhydrous ammonia from a source not shown is fed into vessel 12 through line 13 and means 14 for controlling the rate of flow. Precipitation vessel 12 is equipped with a pH meter not shown and a motor-driven agitator 15 running at such speed as to obtain rapid and intimate mixing of the anhydrous ammonia and the solution from reactor 3. The solution from reactor 3 and anhydrous ammonia are added simultaneously at such rates to maintain a slurry in the pH range of about 7.4 and 8.9 and a gross composition of more than about 45 weight percent total ($N+P_2O_5$), or preferably about 13 to about 16 percent N and about 35 to about 42 percent $P_2O_5$. We prefer to introduce the solution from vessel 3 to vessel 12 at a steady rate according to the capacity of the equipment and to vary the rate of introduction of anhydrous ammonia as may be necessary to maintain the desired pH of the resultant slurry and to have an average retention time in excess of about 5 minutes. As indicated in FIGURE 2, precipitation vessel 12 may be equipped with cooling coils 16 to control the temperature of the slurry to about 20° C., a temperature that favors the formation of a readily filterable slurry. Alternately, this precipitation step may be done without refrigeration, in which case the slurry temperature may range from about 50° C. to 110° C. Water may be added via line 17 and means of control 18 to adjust the viscosity and to maintain the water content of the hot slurry in the range of about 20 to about 47 percent. The unreacted ammonia from precipitation vessel 12 is recycled to reactor 3 via line 19, scrubber 20, and line 21.

The slurry from precipitation vessel 12 is discharged through line 22 to a filter or centrifuge 23 to separate the liquid and solid phases (chiefly diammonium orthophosphate and tetraammonium pyrophosphate monohydrate), and the moist filter cake is discharged through line 24 into granulator 25 where it is mixed with recycle fines. In an alternate step, the slurry from precipitation vessel 12 is discharged through line 26 into granulator 25 where it is mixed with recycle fines. The granules containing about 1 to 8 percent free water from granulator 25 are fed through line 27 into a dryer 28 operated in the temperature range of about 50° C. to about 110° C. The dry granules travel via line 29 to a screening means generally illustrated as screens 30 and crusher 31. The crushed oversize material and the fine material are returned to granulator 25 via lines 32 and 33, respectively. The granular product (product A), discharged through line 34 to storage, will contain about 17 to about 21 percent N and about 52 to about 60 percent $P_2O_5$, and will consist mostly of ammonium ortho-, pyro-, and tripolyphosphates; the ratio of N to $P_2O_5$ and the distribution of phosphate species depend upon the composition of the acid and the processing conditions used.

The filtrate from vessel 23 containing about half the $P_2O_5$ in the starting acid is withdrawn via line 35 and returned to reactor 3 to furnish part of the water, $P_2O_5$, and ammonia required. Alternately, the filtrate from vessel 23 is withdrawn through lines 35 and 36 for use as a solution (product B) with a composition of about 9 to about 12 percent N and about 29 to about 34 percent $P_2O_5$. In another alternative step, the filtrate from vessel 23 is withdrawn through lines 35 and 37 to mixing tank 38 where its $P_2O_5$ content is adjusted by adding superphosphoric acids containing more than about 74 percent $P_2O_5$ from a source not shown through line 39 and any suitable means 40 for controlling the rate of flow. Mixing tank 38 is equipped with a pH meter not shown and a motor-driven agitator 41 running at such speed as to obtain rapid and intimate mixing of the filtrate and acid to form another solution (product C) with a selected pH lower than that in the filtrate. Product C containing about 29 to about 37 percent $P_2O_5$ is withdrawn from mixing tank 38 through line 42 to storage. In still another alternative step, the filtrate from vessel 23 is withdrawn through lines 35 and 43 to mixing tank 44. Superphosphoric acid (>about 75 percent $P_2O_5$) from a source not shown is added to mixing tank 44 through line 45 and any suitable means 46 for controlling the rate of flow to lower the pH down to a range of about 4 to about 5.5. Anhydrous ammonia from a source not shown is added to mixing tank 44 through line 47 and any suitable means 48 for controlling the rate of flow. Mixing tank 44 is equipped with a pH meter not shown and a motor-driven agitator 49 running at such speed as to obtain rapid and intimate mixing of the filtrate from vessel 23, acid, and ammonia to form a solution (product D) which is withdrawn via line 50 to storage. Product D will have a pH ranging from about 4.5 to about 7 and a composition ranging from about 10 to about 13 percent N and about 36 to about 40 percent $P_2O_5$, and which will not precipitate at storage temperatures even as low as 0° C.

In developing this modification of our process to prepare aqueous ammonium phosphate slurries with pH's higher than about 8, we found that superphosphoric acids with a wide range of $P_2O_5$ content could be used although we prefer to use acids with a range of about 76 to 80 percent $P_2O_5$, acids that have the highest content of pyrophosphoric acid.

In alternative procedures, using electric furnace superphosphoric acids with $P_2O_5$ contents ranging from about 74 to 76 percent, the initial ammoniation step is modified to preferentially precipitate and remove a significant portion of the orthophosphate present in the acid. In these alternative procedures, the acid is treated batchwise with water and gaseous ammonia to raise the pH to various values in the range of about 4 to 7.8 while maintaining the temperature below about 70° C.

In one alternative procedure, the first ammoniation step is terminated at about pH 5; the precipitate consists of 70 to 80 percent monoammonium orthophosphate and 20 to 30 percent diammonium pyrophosphate. In another alternative procedure the initial ammoniation is terminated in the pH range 6.5 to 7.8; these intermediate precipitates consist of 60 to 95 percent ammonium orthophosphate, 5 to 35 percent ammonium pyrophosphates, and 0 to 5 percent ammonium tripolyphosphates. The precipitates formed at the various pH's are removed by filtration or by centrifuging and the moist solids are dried or granulated as described previously. The intermediate filtrates are then treated with anhydrous ammonia to raise the pH to about 8.5. The final precipitates, containing from about 19 to about 22 percent N and about 53 to about 59 percent $P_2O_5$, and consisting principally of $(NH_4)_2HPO_4$ and $(NH_4)_4P_2O_7$, are separated and dried or granulated and dried. The final filtrates, containing about half the $P_2O_5$ in the starting acid, will have a composition ranging from about 9 to about 12 percent N and from about 27 to about 34 percent $P_2O_5$ and may be used directly or processed as described above.

When acids containing $P_2O_5$ ranging from about 80 to 83 percent are used, the acid is ammoniated initially under conditions favoring hydrolysis of the more condensed species to mostly pyro- and orthophosphate forms. This alternative procedure for preferential hydrolysis of the condenser species may be carried out as is described in a later-mentioned alternate embodiment of the present invention referred to as modification II.

Although the quantity of water used in each of the alternative procedures may vary widely, we have found that the ammoniation reactions in both the initial and terminal stages are benefited, and the viscosity and the ratio of solid to solution in the slurries produced in the terminal stage are optimum when the total water added ranges from about 0.8 to 1.4 pounds per pound of $P_2O_5$ in the starting acid.

Referring now more specifically to FIGURE 3, we have found also that the filterability of the slurries formed at the higher pH's is related to the temperature at which precipitation of the ammonium phosphates occurs. In our companion study of the system ammonia-pyrophosphoric acid-water at 0° and 25° C. [Farr, T. D., and Fleming, J. D., Journal of Chemical Engineering Data, 10, 20–1 (1965)], we found (1) that anhydrous tetraammonium pyrophosphate is a stable saturating phase at 25° C., but is not a stable phase at 0° C., and (2) that tetraammonium pyrophosphate monohydrate is a stable saturating phase at both temperatures. The anhydrous form crystallizes as monoclinic tablets that filter poorly; the monohydrate crystallizes as monoclinic rods that filter readily. Both salts form when superphosphoric acids are ammoniated in the pH range about 7 to 8.5. In bench-scale tests of our process, tetraammonium pyrophosphate monohydrate was the predominant form when the terminal ammoniation stage was carried out at 20° C. or below; the precipitated phase, without exception, filtered satisfactorily. To illustrate, photomicrographs of precipitates formed at 2 temperature ranges are compared in FIGURE 3. The precipitates that filtered readily were formed at 15° to 20° C., the precipitates that filtered poorly were formed at the higher temperature range, 35° to 70° C.

MODIFICATION II—FIGURES 4 AND 5

In another modification of our process for the preparation of ammonium polyphosphates by the atmospheric ammoniation of superphosphoric acids, which is designated as the controlled hydrolysis process, the acids are ammoniated and hydrolyzed to prepare (1) intermediate aqueous slurries with pH's in the range of about 7.4 and 8.9 that are processed further preferably to produce granular solids containing all the $P_2O_5$ in the starting acid, or (2) intermediate anhydrous melts or solidified products at pH about 6 that are processed further to produce granular solids, concentrated solutions, or suspensions. In developing this modification of our process to produce ammonium polyphosphates with pyrophosphate contents significantly higher than that in the starting acid, we found (1) that superphosphoric acids with $P_2O_5$ contents higher than about 70 percent could be used, although we prefer to use acids with $P_2O_5$ contents higher than about 80 percent in both procedures, and (2) that the temperature and pH at which the concentrated acid (>80 percent $P_2O_5$) was ammoniated initially were critical in controlling the desired hydrolysis reactions. In the ammoniation of acids containing more than about 80 percent $P_2O_5$ to prepare intermediate slurries at high pH, we found it necessary to hydrolyze most of the phosphate species more condensed than the tripolyphosphate. For example, when an acid containing 83.4 percent $P_2O_5$ (65 percent in species more condensed than tripolyphosphate) was ammoniated in the manner described in modification I, an aqueous slurry of ammonium polyphosphates was not prepared because the species more condensed than tripolyphosphate were not hydrolyzed rapidly enough to form sufficient amounts of ortho-, pyro-, and tripolyphosphates for precipitation.

By selecting a set of processing conditions of pH, temperature, and retention time for ammoniating a specific acid (>80 percent $P_2O_5$), all the phosphate species more condensed than tripolyphosphate may be hydrolyzed, although we prefer to operate under conditions in which these long-chain species are reduced by about 50 to 75 percent. For example, when an acid containing 83.4 percent $P_2O_5$ was ammoniated in the presence of water at about 70° C. at a constant pH of about 0.2 for an average retention time of about 18 minutes to form a solution containing 6.0 percent N and 48.4 percent $P_2O_5$, the phosphate species more condensed than tripolyphosphate was reduced from a total of 65 percent in the acid to a total of 31 percent in the solution. When this solution was treated with anhydrous ammonia for an additional 36 minutes at an average temperature of about 90° C., the pH increased from about 0.2 to about 5.9, and the long-chain species were reduced further to a total of about 15 percent. When this solution then was treated in the temperature range of about 50° to about 70° C. with anhydrous ammonia to raise the pH from about 5.9 to about 8.6, a slurry of ammonium phosphates was formed in which about half the $P_2O_5$ in the starting acid was in the precipitate.

In carrying out this hydrolysis procedure, the ammoniation-hydrolysis reactions may be done continuously or batchwise, or as a combination of both. If the acid is ammoniated continuously in one hydrolyzer, hydrolysis conditions are selected to reduce the long-chain phosphate species to no more than about 15 percent.

Referring now more specifically to FIGURE 4, superphosphoric acid (>80 percent $P_2O_5$) from a source not shown is fed through line 51 and any suitable means 52 for controlling the rate of flow into hydrolyzer 53. Anhydrous ammonia from a source not shown is fed into hydrolyzer 53 through line 54 and means 55 for controlling the rate of flow. Water from a source not shown is fed into hydrolyzer 53 through line 56 and means 57 for controlling the rate of flow. Hydrolyzer 53 is equipped with a pH meter not shown, cooling coils 58 to control the temperature of the solution in the range from about 70° to about 110° C., and a motor-driven agitator 59 running at such speed as to obtain rapid and intimate mixing of the acid, water, and ammonia. The three reactants are added simultaneously and at such rates as to maintain a solution with a selected pH in the range of about 0.1 to about 4 and a gross composition of more than about 33 weight percent total $(N+P_2O_5)$, preferably more than about 50 weight percent total $(N+P_2O_5)$ and in which the species more condensed than tripolyphosphate has been reduced to within the range of about 1 to about 30 percent. We prefer to add the acid and water to hydrolyzer 53 at fixed rates according to the capacity of the equipment and to vary the rate of addition of anhydrous ammonia as may be necessary to maintain the desired pH of the resultant solution. The average retention time in hydrolyzer 53 normally will be in excess of about 5 minutes.

If the solution from hydrolyzer 53 contains no more than about 15 percent of its phosphate in species more condensed than tripolyphosphate, the solution from hydrolyzer 53 is transferred directly to precipitator 60 by alternate No. 1 through lines 61 and 62 and means 63 for controlling the rate of flow. If the solution from hydrolyzer 53 contains between about 15 and about 30 percent of its phosphate in species more condensed than tripolyphosphate, the solution from hydrolyzer 53 is transferred by alternate No. 2 to a group of batch hydrolyzers 64 where it is mixed with anhydrous ammonia and make-up water as indicated in the diagram via lines 65, 66, and 67, and means 68, 69, and 70 for controlling the quantities. The batch hydrolyzers 64 are equipped with pH meters not shown, and motor-driven agitators 71 running at such speed as to obtain rapid and intimate mixing of the solution from hydrolyzer 53, the ammonia, and the water. The three reactants are admitted to the batch hydrolyzers 64 in such proportions as to increase the pH from the range of about 0.1 to about 4 up to about 6. The batch hydrolyzers have a combined capacity sufficient to handle the solution produced continuously in hydrolyzer 53. This second alternate ammoniation step is done without cooling and the temperature of the solution may range from about 70° C. to about 110° C. with an average retention time in the hydrolyzer in excess of about 5 minutes. The solution from the batch hydrolyzers 64 passes to precipitator 60 via line 72, holding tank 73, line 74, and any suitable means 75 for controlling the rate of flow.

The solution from the continuous hydrolyzer 53 or from the batch hydrolyzers 64 is fed to precipitator 60, where it is reacted with anhydrous ammonia from a source not shown that is fed into vessel 60 through line 76 and means 77 for controlling the rate of flow. Precipitator 60 is equipped with a pH meter not shown and a motor-driven agitator 78 running at such speed as to obtain rapid and intimate mixing of the anhydrous ammonia and the solution from the continuous hydrolyzer 53 or from the batch hydrolyzers 64, which are added simultaneously and at such rates as to maintain a slurry of ammonium phosphates at a selected pH in the range of about 7.4 to about 8.9 with slurry compositions of more than about 45 weight percent total $(N+P_2O_5)$, or preferably ranging from about 13 to about 16 percent N and about 35 to about 42 percent $P_2O_5$. The average retention time in precipitator 60 normally will be in excess of about 5 minutes. The precipitation reaction in vessel 60 preferably is done without cooling and the temperature of the slurry may range from about 50° to about 110° C. To adjust the viscosity and composition of the slurry, water may be added to vessel 60 via line 79 and means 80 for controlling the rate of flow. Although the quantity of water used may vary widely, the ammoniation reactions in both the initial and terminal stages are benefited, and the viscosity and the ratio of solid to solution in the slurries produced in the precipitator are optimum, when the total water added ranges from about 0.8 to about 1.4 pounds per pound of $P_2O_5$ in the starting acid. In the precipitator the water content will range from about 20 to about 47 percent. The unreacted ammonia from precipitator 60 is recycled to hydrolyzer 53 via line 81, scrubber 82, and line 83.

The slurry from precipitator 60 is discharged through line 84 to granulator 85 where it is mixed with recycle fines. The granules, normally containing about 1 to 8 percent free water, are fed through line 86 into a dryer 87 operating in the temperature range of about 50° to about 110° C. The dry granules from 87 travel via line 88 to a screening means generally illustrated as screens 89 and crusher 90. The crushed oversize material and the fine material are returned to granulator 85 via lines 91 and 92, respectively. The granular product (product E), discharged through line 93 to storage, will contain about 17 to about 21 percent N and about 52 to about 60 percent $P_2O_5$ and will consist mostly of ammonium ortho-, pyro-, and tripolyphosphates; the ratio of N to $P_2O_5$ and the distribution of phosphate species in product E will depend upon the composition of the acid and the processing conditions used.

In alternative procedures of modification II of our process, as generally illustrated in FIGURE 5, a known quantity of superphosphoric (>70 percent $P_2O_5$) from a source not shown is fed through line 94 to hydrolyzer 95. Anhydrous ammonia from a source not shown is fed into hydrolyzer 95 through line 96 and means 97 for controlling the quantity. Water vapor from a source not shown is fed into hydrolyzer 95 through line 98 and means 99 for controlling the quantity. Hydrolyzer 95 is equipped with a pH meter not shown and a motor-driven agitator 100 running at such speed as to obtain rapid and intimate mixing of acid, ammonia, and water. Hydrolyzer 95 also is equipped with any suitable means 101 for heating or cooling to maintain a selected temperature in the range of about 125° C. to about 200° C. The ammonia and water vapor are added to the acid in amounts and rates to form an intermediate melt or a solidified product with pH's in the range of about 5 to 6. Electric-furnace or wet-process acid can be used. Anhydrous ammonia or other sources of ammonia such as ammonium carbonates, ammonium carbamate, urea, etc., may be used in this ammoniation step although anhydrous ammonia is preferred. Compounds other than ammonia and its derivatives may be used also in our process to neutralize the acids. For example, basic reagents such as potassium hydroxide, potassium carbonate, sodium hydroxide, etc., can be used depending upon the desired composition of the final products. The amount of water used may vary from about 100 to 3000 percent of that theoretically required to hydrolize to pyrophosphate all the species in the starting acid more condensed than $H_4P_2O_7$. The ammonia and water vapor may be added simultaneously from the beginning, the addition of water may be delayed until the acid is ammoniated to pH about 1, the addition of ammonia may be continued after the addition of water is stopped, or the addition of water may be continued after the addition of ammonia is stopped. The intermediate melt at pH about 6 may be formed also in a multistage continuous operation. The intermediate melt at pH about 6 formed in a batch or continuous operation is then processed further; the processing steps depend upon the final product desired. For example, the intermediate melt may preferably be processed in alternative methods 1, 2, 3, or 4, as generally illustrated in FIGURE 5, or the intermediate melt may be used directly as a solidified melt as alternate No. 5. In alternative method 1, the melt is granulated with recycle to form product F. In alternative method 2, the melt is treated with water and anhydrous ammonia to form an intermedaite slurry at pH about 8, which is then granulated with recycle to form product G, or it is granulated with the intermediate melt and recycle to form product H. In alternative method 3, the intermediate melt is dissolved in water or in aqua ammonia to form a solution product I. In alternative method 4, the intermediate melt is treated with water in relatively smaller amounts, and the resulting mixture may be ammoniated further to form a suspension product J. Details of these alternative treatments of the intermediate melt follow.

The melt from hydrolyzer 95 is discharged through line 102 to holding tank 103 fitted with means not shown for controlling the temperature sufficiently high to maintain product from hydrolyzer 95 as a fluid melt. The melt from 103 is discharged through line 104 to alternate line 105 and any suitable means 106 for controlling the rate of flow to granulator 107, where it is mixed with recycle fines and water that is added to granulator 107 by means not shown in an amount ranging from about 1 to about 5 percent by weight of melt plus recycle. The granules from granulator 107 are fed through line 108 into dryer 109 wherein the species more condensed than pyrophosphate that may be present are hydrolyzed further by drying in the temperature range of about 60 to about 105° C. in a humid atmosphere. The dry granules travel via line 110 to a screening means generally illustrated as screens 111 and crusher 112. The crushed oversize material and the fine material are returned to granulator 107 via lines 113 and 114, respectively. The granular product (product F), discharged through line 115 to storage, will contain about 15 to about 17 percent N and about 58 to about 64 percent $P_2O_5$ and will comprise a mixture of ammonium phosphates with pyrophosphate the predominant species ranging from about 40 to about 90 percent.

In alternative method 2, the intermediate melt is discharged from holding tank 103 through line 104 to alternate line 116 and any suitable means 117 for controlling the rate of flow to precipitation vessel 118. Water from a source not shown is fed into precipitator 118 through line 119 and any suitable means 120 for controlling the rate of flow. Anhydrous ammonia from a source not shown is fed into precipitator 118 through line 121 and any suitable means 122 for controlling the rate of flow. Precipitator 118 is equipped with a pH meter not shown and a motor-driven agitator 123 running at such speed as to obtain rapid and intimate mixing of the melt, water, and ammonia that are added simultaneously at such rates as to maintain a slurry with a selected pH in the range of about 7.4 to about 8.9 and with ratios of N to $P_2O_5$ higher than that in the intermediate melt. The slurry from precipitator 118 is discharged through line 124 to granulator 107 where it is mixed with recycle fines. The granules normally containing about 1 to 8 percent free water from granulator 107 are fed through line 108 into dryer 109. The dry granules travel via line 110 to a screening means generally illustrated as screen 111 and crusher 112. The crushed oversize material and the fine material are returned to granulator 107 via lines 113 and 114, respectively. The granular product (product G), discharged through line 115 to storage, will contain about 18 to about 21 perecnt N and about 56 to about 59 percent $P_2O_5$, and will comprise a mixture of ammonium phosphates with pyrophosphate the predominant form.

The slurry from precipitator 118 may be granulated also with intermediate melt and recycle to form product H, which will contain about 20 percent N and about 59 percent $P_2O_5$ and will comprise a mixture of ammonium phosphates with pyrophosphate the predominant form.

In alternative method 3, the intermediate melt is discharged from holding tank 103 through lines 104 and 125 and any suitable means 126 for controlling the rate of flow to vessel 127 where it is dissolved with water added alone from a source not shown through line 128 and any suitable means 129 for controlling the rate of flow, or where it is dissolved in a combination of water, added as described, and anhydrous ammonia added from a source not shown through line 130 and any suitable means 131 for controlling the rate of flow. Vessel 127 is equipped with a pH meter not shown and a motor-driven agitator 132 running at such speed as to obtain rapid and intimate mixing of the melt and water, or melt, water, and ammonia added simultaneously at such rates as to maintain a solution product I which is stable at low temperatures as, for example, at 0° C. and which will contain about 10 to about 12 percent N and about 32 to about 42 percent $P_2O_5$ with pyrophosphate contents significantly higher than that in the starting acid. Product I is discharged to storage through line 133.

In alternative method 4, the intermediate melt from holding tank 103 is discharged through lines 104 and 134 and any suitable means 135 for controlling the rate of flow to mixing tank 136 where it is mixed with water from a source not shown added through line 137 and any suitable means 138 for controlling the rate of flow and then treated with anhydrous ammonia added from a source not shown through line 139 and any suitable means 140 for controlling the rate of flow. Mixing tank 136 is equipped with a pH meter not shown and a motor-driven agitator 141 running at such speed as to obtain rapid and intimate mixing of melt, water, and ammonia added simultaneously at such rates as to maintain suspension product J at a selected pH, gross composition and viscosity. Product J is discharged from 136 through line 142 to storage.

In alternate No. 5, the intermediate melt from holding tank 103 is transferred via line 143 to storage for cooling to about 25° C. and for forming a solidified product containing about 14 to about 18 percent N and about 56 to about 66 percent $P_2O_5$ and will comprise a mixture of ammonium phosphates with pyrophosphate the predominant form.

In order that those skilled in the art may better understand how the present invention can be practiced, the following examples of specification applications are given by way of illustration but not by way of limitation. Bench-scale tests of the several methods described above were made batchwise or continuously with electric-furnace superphosphoric acids with $P_2O_5$ contents ranging from about 75 to about 83 percent. Tests also were made with wet-process acids that had been concentrated thermally to $P_2O_5$ contents of (1) about 71 percent from "black" commercial acid (about 52 percent $P_2O_5$) produced from uncalcined phosphate rock, and (2) about 74 percent from "green" commercial acid (about 52 percent $P_2O_5$) produced from calcined phosphate rock.

EXAMPLE I

In one test (AA-1) of modification I of our process illustrated in FIGURE 2, electric-furnace superphosphoric acid (77 percent $P_2O_5$), water, and ammonia were combined at about 70° C. to form a stock solution (LP-1) with pH 5.8. The solution contained 11.1 percent N and 37.6 percent $P_2O_5$, with the $P_2O_5$ distributed as ortho- 37, pyro- 46, tripoly- 15, and tetra-polyphosphate 2 percent. Part of the solution was then treated batchwise at 15° to 20° C. with anhydrous ammonia to produce a slurry with a pH of 8.5. The thick slurry (viscosity about 6000 cps.) was filtered under house vacuum (about 27 in.), the filtrate was recycled to weighed portions of stock solution LP-1, and then ammoniated as before to pH 8.5. The cycle was repeated three times. Each filtration was satisfactory (about 100 lb./hr./sq. ft.). The results, summarized in Table I below, show that the four solid products, after drying in air at about 25° C. or in an oven at 66° C., were quite constant with respect to composition (N about 20.8 percent, $P_2O_5$ about 56.5 percent) and to phosphate distribution (ortho-, pyro-, and tripolyphosphates about 40, 50, and 10 percent, respectively). The four filtrates had similar compositions (N 11.2 to 11.5 percent, $P_2O_5$ 30.4 to 30.9 percent). The distribution of phosphate species in the filtrates also was quite constant in the various cycles.

TABLE I.—RECYCLING TEST (AA-1) WITH FERTILIZER SOLUTION 11-37-0

| Cycle | I | II | III | IV |
|---|---|---|---|---|
| Input, grams $P_2O_5$: | | | | |
| In 11-37-0 (LP-1) | 111 | 63 | 68 | 54 |
| In filtrate (recycle) | 0 | 40 | 35 | 47 |
| Product (filtrate): | | | | |
| Weight, grams | 130 | 116 | 154 | 160 |
| $P_2O_5$, grams | 40 | 35 | 47 | 49 |
| Composition, percent: | | | | |
| N | 11.5 | 11.2 | 11.3 | 11.5 |
| $P_2O_5$ | 30.9 | 30.5 | 30.4 | 30.8 |
| $P_2O_5$ distribution, percent: | | | | |
| Ortho | 43 | 42 | 39 | 37 |
| Pyro | 32 | 29 | 40 | 32 |
| Tripoly | 22 | 24 | 20 | 30 |
| Tetrapoly | 3 | 6 | 2 | 2 |
| Solid: | | | | |
| Weight, grams | 114 | 84 | 79 | 82 |
| $P_2O_5$, grams | 64 | 56 | 45 | 45 |
| Composition, percent: | | | | |
| N | 20.9 | 20.9 | 20.7 | 20.6 |
| $P_2O_5$ | 56.4 | 56.3 | 57.0 | 55.4 |
| $P_2O_5$ distribution, percent: | | | | |
| Ortho | 34 | 41 | 41 | 42 |
| Pyro | 56 | 51 | 48 | 50 |
| Tripoly | 8 | 8 | 10 | 8 |
| Tetrapoly | 1 | 1 | 1 | 1 |
| Fraction, percent of total $P_2O_5$: | | | | |
| In solid | 61.5 | 61.5 | 49 | 48 |
| In final filtrate | | | | 17 |

EXAMPLE II

In another test (AA-2) of modification I illustrated in FIGURE 2, electric-furnace superphosphoric acid (SA-1: 80 percent $P_2O_5$), water, and ammonia were combined as described in test AA-1 to form another stock solution (LP-12) with pH 5.9. Part of this solution was treated at 15° to 20° C. with anhydrous ammonia to produce a slurry at pH 8.6, and part of the thick slurry (12A-SL) was filtered under house vacuum.

Part of the filter cake was dried in air at about 25° C., crushed to pass a 12-mesh screen and the fines were mixed with the moist solids (12A-MS) in the ratio of 2 parts air-dried fines (12A-S) to 1 part wet solids (12A-MS). The moist granules then were dried at 66° C. to yield a granular product (12A-GS) with good physical properties and a composition corresponding to 8.8 pounds $NH_3$ per unit $P_2O_5$.

The filtrate (12A-L) contained 11.1 percent N and 31.2 percent $P_2O_5$; it could be recycled to the process as described in Example I, used directly as liquid (product B), or upgraded for use as liquid (products C or D) as described in the specification and FIGURE 2. In one test, part of the filtrate (12A-L) was treated with superphosphoric acid (SA-1; 80 percent $P_2O_5$) to lower the pH to 6; the fortified solution (product C, FIGURE 2), which was stable at 0° C., contained 10.4 percent N and 34.9 percent $P_2O_5$ with the $P_2O_5$ distributed as ortho- 25, pyro- 30, tripoly- 33, tetrapoly- 9, and longer chain phosphates 3 percent. The composition and phosphate distribution of the stock solution (LP-12), the filtrate (12A-L) and the various solids are summarized in Table II below.

test AA-2 in Table II. These results show that the N and $P_2O_5$ contents and phosphate distribution of the products of both tests were quite similar, although the temperature at which the slurries were produced was significantly different in the two tests (70° C. in test AA-3; 15 to 20° C. in test AA-2). Thus, it is not necessary to remove by refrigeration the heat evolved in the precipitation reaction (vessel 12; FIGURE 2) to produce granular ammonium polyphosphate with good physical properties and a high degree of ammoniation (about 8.8 lb. $NH_3$ per unit $P_2O_5$).

EXAMPLE IV

Additional tests of modification I illustrated in FIGURE 2 were made to determine whether the grade of the filtrates could be increased significantly by simple acidulation and reammoniation to produce solutions stable at 0° C. (product D; FIGURE 2).

In the tests, superphosphoric acid No. 24 (77.4 percent $P_2O_5$) was ammoniated in two stages as described in Examples I and II. The slurry at pH 8.4 was filtered and the filtrate was acidulated with acids No. 24 or No. 47 (79.6 percent $P_2O_5$) and reammoniated to various pH levels. The fortified solutions then were stored at 0° C. in stoppered bottles. After 3 days, the samples that contained no precipitate were seeded with a few grains of the solid phase (principally diammonium orthophosphate and tetra-

TABLE II.—COMPOSITION OF PRODUCTS OF FILTRATION PROCESS—MODIFICATION I

| Test | Material | Sample Sample No. | Composition, percent | | $P_2O_5$ distribution, percent | | | | |
|---|---|---|---|---|---|---|---|---|---|
| | | | N | $P_2O_5$ | Ortho | Pyro | Tri | Tetra | Other |
| AA-2 | Stock soln | LP-12 | 11.1 | 36.7 | 31 | 40 | 20 | 7 | 3 |
| | Slurry [1] | 12A-SL | 14.1 | 35.2 | 30 | 40 | 19 | 7 | 3 |
| | Filtrate | 12A-L | 11.1 | 31.2 | 23 | 27 | 34 | 11 | 5 |
| | Moist solid | 12A-MS | 16.9 | 39.1 | 34 | 49 | 11 | 4 | 2 |
| | Dry solid [2] | 12A-S | 19.4 | 54.9 | 33 | 46 | 14 | 4 | 3 |
| | Granules | 12A-GS | 20.5 | 56.7 | 33 | 48 | 15 | 3 | 1 |
| AA-3 | Stock soln | LP-12 | 11.1 | 36.7 | 31 | 40 | 20 | 7 | 3 |
| | Slurry [3] | 11E-SL | 15.0 | 40.4 | 32 | 44 | 23 | 1 | |
| | Filtrate | 11E-L | 11.6 | 32.2 | 33 | 27 | 39 | 2 | |
| | Moist solid | 11E-MS | 17.2 | 45.4 | | | | | |
| | Dry solid [2] | 11E-S | 20.9 | 56.4 | 31 | 53 | 16 | | |
| | Granules | 11E-GS | 20.7 | 57.2 | 32 | 51 | 17 | | |

[1] Slurry prepared by batch ammoniation of solution LP-12 to pH 8.6 at 20° C.
[2] Recycle.
[3] Slurry prepared continuously at a pH about 8, and at a temperature about 70° C.

EXAMPLE III

In another test (AA-3) similar to test AA-2 described above, stock solution LP-12 was treated with anhydrous ammonia to produce continuously a slurry at pH about 8. No refrigeration was provided, and the temperature of the slurry was about 70° C. The slurry (11E-SL) was centrifuged, the solution phase (11E-L) was decanted and reserved, and the moist solids (11E-MS) then were granulated as described in test AA-2. The dry granules (11E-GS) had good physical properties and a composition corresponding to 8.8 lb. $NH_3$ per unit $P_2O_5$.

The composition and phosphate distribution of the various products of test AA-3 are compared with those of ammonium pyrophosphate). After storage for 60 days, the composition of the unsaturated solutions were determined. These tests show that solutions stable at 0° C. with a composition of about 11 percent N and 39 percent $P_2O_5$ may be prepared by acidulating and reammoniating the filtrates that are produced in the process. The stable solutions prepared by acidulating the filtrates with superphosphoric acid No. 24 contained about 58 percent of its $P_2O_5$ in nonorthophosphate forms, whereas the solutions prepared by acidulating portions of the same filtrate with the more concentrated acid No. 47 contained about 65 percent of its $P_2O_5$ in nonorthophosphate forms. The results are summarized in Table III below.

TABLE III.—N-P SOLUTIONS [1] STABLE AT 0° C.

| Acid added [2] | pH pattern | | Stable solutions | | | | | | |
|---|---|---|---|---|---|---|---|---|---|
| | Reacidulation | Reammoniation | Composition, percent | | Distribution, percent of $P_2O_5$ | | | | |
| | | | N | $P_2O_5$ | Ortho | Pyro | Tripoly | Tetrapoly | Other |
| 24 | 4.0 | 5.5 | 11.3 | 39.2 | 41 | 41 | 14 | 3 | 1 |
| | 4.5 | 5.5 | 10.5 | 38.0 | 42 | 40 | 14 | 3 | 1 |
| | 5.0 | 5.5 | 10.4 | 36.4 | 42 | 40 | 14 | 3 | 1 |
| | 5.0 | 6.2 | 11.2 | 35.9 | | | | | |
| 47 | 4.0 | 5.5 | 11.1 | 39.5 | 34 | 38 | 18 | 6 | 3 |
| | 4.5 | 5.5 | 10.7 | 38.3 | 35 | 39 | 18 | 6 | 3 |
| | 5.0 | 5.5 | 10.4 | 36.9 | 36 | 38 | 17 | 5 | 3 |
| | 5.0 | 6.2 | 11.4 | 36.5 | | | | | |

[1] The solutions were prepared for storage by adding superphosphoric acid and anhydrous ammonia to a solution phase (filtrate) obtained from the ammoniation of superphosphoric acid at atmospheric pressure to pH 8.4. The stock filtrate (24-E) contained 11.2 percent N and 29.2 percent $P_2O_5$, with $P_2O_5$ distributed as ortho- 43, pyro- 40, and tripoly- and long-chain phosphates combined 17 percent.
[2] Superphosphoric acid No. 24 contained 77.4 percent $P_2O_5$ distributed as ortho- 36, pyro- 46, tripoly- 14, and longer-chain phosphoric acids 4 percent; acid No. 47 contained 79.6 percent $P_2O_5$ distributed as ortho- 19, pyro- 42, tripoly- 21, tetrapoly- 10, pentapoly- 5, and longer-chain phosphoric acids 3 percent.

EXAMPLE V

Additional tests of modification I were made using electric-furnace superphosphoric acids with $P_2O_5$ contents in the range of about 74 to 76 percent to determine the ammoniation conditions for preferential precipitation of the ortho- and pyrophosphate species.

In one series of tests, the superphosphoric acids were titrated with aqua ammonia (about 28 percent $NH_3$) to raise the pH to the range 4 to 5 while stirring and cooling. The amount of water added ranged from about 90 to 110 grams per 100 grams of $P_2O_5$ in the acid, and the reaction mixture was maintained in the temperature range 25° to 60° C. During this initial ammoniation step, needles of monoammonium orthophosphate and a very fine phase formed at pH about 2; further addition of aqua ammonia caused growth of the acicular crystals of $NH_4H_2PO_4$, but the fine phase did not reach sufficient size for petrographic identification. In the pH range 2 to 4, the precipitate was very difficult to filter. However, at about pH 4.5 most of the fine precipitate dissolved and a filterable product was produced; the solid phase contained about 40 percent of the $P_2O_5$ initially charged, distributed as monoammonium orthophosphate 70 to 80 percent and diammonium pyrophosphate 20 to 30 percent. The $P_2O_5$ in the filtrates was distributed as orthophosphate 35 to 50, pyrophosphate 35 to 50, and longer-chain phosphates about 1 to 15 percent. Further treatment of the filtrates with gaseous ammonia to pH about 8.5, while maintaining the temperature of the reaction mixture at 15 to 25° C., produced precipitates that contained about 10 percent of the $P_2O_5$ initially charged, distributed as diammonium orthophosphate 20 to 30, tetraammonium pyrophosphate 70 to 80, and ammonium tripolyphosphate 0 to 10 percent. The filtrates at pH about 8.5 contained about 50 percent of the $P_2O_5$ initially charged, distributed as orthophosphate 45 to 52, pyrophosphate 35 to 45, and longer-chain phosphates about 3 to 10 percent. Results of one test (1A and 1B) are summarized in Table IV below.

that contained 4 to 28 percent of the $P_2O_5$ initially charged, distributed as diammonium orthophosphate 40 to 55, tetraammonium pyrophosphate 40 to 60, and ammonium tripolyphosphate 0 to 8 percent. The filtrates contained about 11 percent N and 28 to 30 percent $P_2O_5$, with the $P_2O_5$ distributed as orthophosphate 42 to 52, pyrophosphate 36 to 46, and longer-chain phosphates 6 to 17 percent. Results of three tests (2A and 2B, 3A and 3B, 4A and 4B) are summarized in Table IV supra.

The results show that orthophosphate was precipitated preferentially as the monoammonium salt at pH 4 to 5 and as the diammonium salt at pH 6.8 to 8.5. Pyrophosphate was precipitated preferentially as the diammonium salt at pH 4 to 5 and as the tetraammonium salt at pH 6.8 to 8.5. Very little tripolyphosphate was found in the precipitates. Moreover, these results show that electric-furnace superphosphoric acid containing 74 to 76 percent $P_2O_5$ may be ammoniated under specified conditions to produce ammonium polyphosphates with various ratios of ortho- to pyrophosphate.

EXAMPLE VI

In another test of modification I of our process, superphosphoric acid containing 79.6 percent $P_2O_5$ was combined with anhydrous ammonia and water as shown schematically in FIGURE 2. The temperature was maintained at about 70° C. and the pH at about 6 while producing continuously a stock solution that contained 11.4 percent N and 37.5 percent $P_2O_5$. For a starting slurry, 360 ml. of the stock solution was ammoniated batchwise in an insulated precipitation vessel (volume, 360 ml.) fitted with a stirrer and an overflow line. The batch of stock solution was ammoniated from an initial pH of 6 up to 8.6 in about 25 minutes while the temperature rose from 25° to 60° C. Continuous preparation of slurry was then started with the operating conditions and results shown in Table V below.

The granular product had good physical properties, remaining dry and free flowing after extended periods of storage.

TABLE IV.—AMMONIATION OF SUPERPHOSPHORIC ACID

[Acid contained 75.2% $P_2O_5$, distributed as 52% ortho-, 34% pyro-, 13% longer-chain phosphates]

| Test No.[1] | pH | Solid product | | | | | | Filtrate | | | | |
|---|---|---|---|---|---|---|---|---|---|---|---|---|
| | | Yield, percent of initial $P_2O_5$ | Compn. percent | | Distribution, percent of $P_2O_5$ | | | Compn., percent | | Distribution, percent of $P_2O_5$ | | |
| | | | N | $P_2O_5$ | Ortho[2] | Pyro[3] | Other | N | $P_2O_5$ | Ortho | Pyro | Other |
| 1A | 4.5 | 42.0 | 12.5 | 62.5 | [4]77 | [5]23 | | | | 43 | 49 | 8 |
| 1B | 8.5 | 8.6 | 20.6 | 58.9 | 25 | 75 | | | | 51 | 39 | 10 |
| 2A | 6.8 | 20.9 | 20.8 | 54.1 | 93 | 6 | 1 | 11 | 33 | 47 | 48 | 5 |
| 2B | 8.5 | 17.4 | 21.3 | 55.2 | 54 | 42 | 4 | 11 | 30 | 52 | 40 | 8 |
| 3A | 7.2 | 24.4 | 20.8 | 54.3 | 85 | 15 | | | | 46 | 46 | 8 |
| 3B | 8.5 | 17.3 | 21.9 | 56.6 | 43 | 57 | | | | 46 | 37 | 17 |
| 4A | 7.6 | 29.4 | 20.9 | 54.5 | 80 | 20 | | 11 | 30 | 50 | 43 | 7 |
| 4B | 8.5 | 8.4 | 21.2 | 56.8 | 41 | 59 | | 11 | 28 | 52 | 40 | 8 |

[1] The first in each pair of entries represents the initial precipitation, the second represents the final precipitation.
[2] Present as diammonium orthophosphate.
[3] Present as tetraammonium pyrophosphate.
[4] Present as monoammonium orthophosphate.
[5] Present as diammonium pyrophosphate.

In other tests with these acids, the initial ammoniation step was carried out in the same manner as described above, except that the precipitates which formed at low pH's were not filtered off but were redissolved by further additions of aqua ammonia or gaseous ammonia to pH of about 5.5. Further treatment of these solutions with anhydrous ammonia to such intermediate pH levels as 6.8, 7.2, and 7.6 produced precipitates that were removed without difficulty by filtration or centrifuging; they contained 15 to 37 percent of the $P_2O_5$ initially charged, distributed as diammonium orthophosphate 60 to 93, tetraammonium pyrophosphate 9 to 40, and ammonium tripolyphosphate 1 to 4 percent. The filtrates contained about 11 percent N and 30 to 33 percent $P_2O_5$, with the $P_2O_5$ distributed as orthophosphate 46 to 50, pyrophosphate 42 to 48, and longer-chain phosphate 2 to 12 percent. Further treatment of these filtrates with anhydrous ammonia to pH about 8.5 produced precipitates Table V.—Test No. 11B Feed rate, g./min.:
 Stock solution _____ 18
 Anhydrous ammonia _____ Small excess
Temperature of feed solution, ° C._____ 71
Precipitator:
 Temperature, ° C. _____ 66
 pH of slurry _____ 7.4
 Average retention time of slurry, min. _____ 45
 Discharge rate, g./min. _____ 15
 Time of operation, min. _____ 205
Slurry composition, percent:
 N _____ 14.8
 $P_2O_5$ _____ 41.7
 Lb. $NH_3$/unit $P_2O_5$ _____ 8.6
Granulation of slurry:
 Wt. ratio of recycle fines to slurry _____ 4
 Drying temp., ° C. _____ 66

Table V—Continued
Composition of granular product, percent:
- N _____ 19.5
- $P_2O_5$ _____ 58.3
- Free $H_2O$ _____ 0.3
- Lb. $NH_3$/unit $P_2O_5$ _____ 8.1

EXAMPLE VII

In another test of modification I, the starting slurry for use in the continuous operation of the precipitator was made batchwise with the same conditions as described in Example VI. Continuous preparation of slurry was then accomplished with the operating conditions and results summarized in Table VI below.

The granular product had good physical properties.

Table VI.—Test No. 11C
- Stock solution, g./min. _____ 14
- Anhydrous ammonia _____ Small excess
- Temperature of feed solution, ° C _____ 25

Table VII—Continued
Granulation of slurry:
- Wt. ratio of recycle fines to slurry _____ 4
- Drying temperature, ° C. _____ 66

Composition of granular product, percent:
- N _____ 20.2
- $P_2O_5$ _____ 57.2
- Free $H_2O$ _____ 0.6
- Lb. $NH_3$/unit $P_2O_5$ _____ 8.6

EXAMPLE IX

This example of modification I shows how the distribution of the phosphate species in a starting acid changed during the continuous production of stock solution (grade about 11–37–0) and slurry, and during subsequent granulation and drying to produce a granular product. The operating conditions were the same as those described in Example VI; the composition and phosphate distribution of the acid, solution, slurry, and final product are given in Table VIII below.

TABLE VIII.—TEST NO. 2G

|  | Composition, percent | | | Distribution, percent, of $P_2O_5$ | | | | | | More condensed than hexa |
|---|---|---|---|---|---|---|---|---|---|---|
|  | N | $P_2O_5$ | Free $H_2O$ | Ortho | Pyro | Tri | Tetra | Penta | Hexa |  |
| Acid | | 79.6 | | 25 | 39 | 20 | 9 | 4 | 2 | 1 |
| Stock solution | 11.4 | 37.5 | | 26 | 39 | 22 | 8 | 3 | 1 | 1 |
| Slurry | 14.3 | 38.4 | 32.5 | 25 | 38 | 24 | 8 | 2 | 2 | 1 |
| Granular product [1] | 19.6 | 57.8 | 0.8 | 28 | 39 | 32 | 1 | | | |

[1] Drying temperature, 66° C.

Precipitator:
- Temperature, ° C. _____ 57
- pH of slurry _____ 8.6
- Average retention time of slurry, min. _____ 48
- Discharge rate, g./min. _____ 12
- Time of operation, min. _____ 191

Slurry composition, percent:
- N _____ 13.9
- $P_2O_5$ _____ 37.4
- Lb. $NH_3$/unit $P_2O_5$ _____ 9.0

Granulation of slurry:
- Wt. ratio of recycle fines to slurry _____ 4
- Drying temperature, ° C. _____ 66

Composition of granular product, percent:
- N _____ 19.7
- $P_2O_5$ _____ 57.2
- Free $H_2O$ _____ 1.1
- Lb. $NH_3$/unit $P_2O_5$ _____ 8.4

EXAMPLE VIII

In another test of modification I, the starting slurry for use in the continuous operation of the precipitator was made batchwise under the same conditions described in Example VI. Continuous preparation of slurry was then accomplished as in Example VI except that water was added during the test to make up for that lost due to evaporation. The operating conditions and variables used in this test are summarized in Table VII below.

The granular product had good physical properties.

Table VII.—Test No. 11E
Feed rate, g./min.:
- Stock solution _____ 18
- Water _____ 0.6
- Anhydrous ammonia _____ Small excess
- Temperature of feed solution, ° C. _____ 70
- Temperature of water added, ° C. _____ 25

Precipitator:
- Temperature, ° C. _____ 70
- pH of slurry _____ 8.0
- Discharge rate, g./min. _____ 14
- Average retention time of slurry, min. _____ 47
- Time of operation, min. _____ 150

Slurry composition, percent:
- N _____ 15.0
- $P_2O_5$ _____ 38.9
- Lb. $NH_3$/unit $P_2O_5$ _____ 9.4

The results show that the initial phosphate distribution remained nearly constant during production of the stock solution and of the slurry. However, the ammonium polyphosphate compounds more highly condensed than the tripolyphosphate form, namely the tetrapoly, pentapoly, hexapoly forms, etc., were almost completely hydrolyzed during drying of the granular product at 66° C. The amount of phosphate present in forms more condensed than tripolyphosphate was decreased from 13 percent in the slurry to only 1 percent in the dry granular product. This is highly advantageous to the process as the long-chain phosphate species are converted to shorter-chain species which have better storage properties.

EXAMPLE X

In another test of modification I, a batch of slurry was prepared by adding anhydrous ammonia gas to 1200 grams of a stock solution of ammonium polyphosphates that contained about the same amount of N and $P_2O_5$ as the solutions described in previous Examples VI, VII, VIII, and IX. The temperature was maintained between 15° and 20° C. by cooling the reaction vessel in a chilled water bath while adding enough ammonia to raise the pH from 5.8 to 8.5. Vigorous agitation was provided during the ammoniation. The final slurry contained 13.9 percent N and 36.6 percent $P_2O_5$.

To facilitate granulation of the slurry, it was separated into liquid and moist solid phases by filtration. The moist solids were dried at 66° C., then crushed to minum 6 mesh and added to a portion of the filtrate in weight ratios of 2 parts solid to 1 part filtrate. The mixture was stirred manually until homogeneous and then dried at 66° C. In the second granulation step, the dried material (3 parts) was mixed with the remaining filtrate (1 part) and then dried as before. The granulation steps are given in Table IX below.

TABLE IX.—GRANULATION, EXAMPLE X

| Granulation step | Charge, g. | | | Dried product, g. |
|---|---|---|---|---|
|  | Dried solids | | Filtrate |  |
|  | Start | Recycle |  |  |
| 1 | 505 | | 252 | 631 |
| 2 | 0 | 631 | 212 | 728 |
| Total input | 505 | | 464 | |

The total nitrogen lost during the two granulation steps was calculated to be about 3 percent. The composition and distribution of phosphate species of the starting solution, the slurry phases, and the granular product are summarized in Table X below.

TABLE X.—COMPOSITION OF GRANULES, EXAMPLE X

| | Composition, percent | | Distribution, percent, $P_2O_5$ | | | |
|---|---|---|---|---|---|---|
| | N | $P_2O_5$ | Ortho | Pyro | Tripoly | Other |
| Starting solution | 11.1 | 37.6 | 42 | 48 | 9 | 1 |
| Slurry: | | | | | | |
| Filtrate | 11.2 | 29.4 | 45 | 35 | 19 | 1 |
| Dried solids | 21.4 | 56.0 | 39 | 54 | 6 | 1 |
| Granular product | 20.9 | 56.3 | 40 | 50 | 9 | 1 |

The granular product had good physical properties and contained only 0.1 percent free water.

EXAMPLE XI

Another test of modification I was made to determine the stability of the granular product when recycled under conditions similar to those normally found in plant granulation and drying procedures.

About 5 pounds of product was made by granulating the slurry that was prepared by the procedure described in Example X; the granular product made in the same test was used as starting recycle material. The slurry contained approximately 14 percent N and 37 percent $P_2O_5$.

The starting recycle was mixed with a portion of the slurry at a weight ratio of 4 parts to 1 part of slurry. The mixture was stirred manually until homogeneous and then dried at 66° C. This process was repeated eight times (recycle ratios of 3 or 4) to produce 2149 grams of dry granular product. The eight successive granulation steps are shown in Table XI below.

TABLE XI.—TEST NO. LP-5

| Granulation step | Feed to granulation, g. | | Product (g.), Mesh size | | |
|---|---|---|---|---|---|
| | Dry recycle | Slurry | −6 +12 | −12 | Total |
| 1 | 640 | 160 | | | 744 |
| 2 | 744 | 186 | | | 876 |
| 3 | 876 | 219 | | | 1,004 |
| 4 | 1,004 | 251 | | | 1,143 |
| 5 | 1,143 | 286 | 1,106 | 215 | 1,321 |
| 6 | 1,321 | 84 | 1,212 | 165 | 1,377 |
| 7 | 1,377 | 458 | 1,407 | 258 | 1,665 |
| 8 | 1,665 | 555 | 1,833 | 183 | 2,016 |
| 9 | 2,016 | 209 | 2,067 | 82 | 2,149 |

The compositions of the initial recycle material and the final product are given in Table XII below.

TABLE XII.—COMPOSITION OF GRANULES, EXAMPLE XI

| | Composition, percent | | | | Distribution, percent, $P_2O_5$ | | | |
|---|---|---|---|---|---|---|---|---|
| | N | $P_2O_5$ | Lb. $NH_3$/unit $P_2O_5$ | $H_2O$ | Ortho | Pyro | Tri | Other |
| Initial recycle | 21.4 | 56.0 | 9.3 | 0.1 | 40 | 50 | 9 | 1 |
| Final product | 21.3 | 55.8 | 9.3 | 0.2 | 42 | 48 | 9 | 1 |

The results show that the composition and phosphate distribution were not changed when the granular product was prepared by a multiple recycle process of granulation and drying.

EXAMPLE XII

Other tests of modification I were made to determine the effect of ammoniation temperature on the distribution of phosphate species in the slurries obtained at high pH. The starting solution in these tests was prepared from superphosphoric acid by the procedure shown schematically in FIGURE 2; the distribution of phosphate species in this stock solution was essentially the same as that in the acid used. Portions of this stock solution (pH 6.1) were treated with anhydrous ammonia at different temperatures to form three batches of slurry at pH about 8.5. In tests 9A and 9B, the starting temperatures were 64° and 27° C., respectively, and no heat was removed intentionally from the insulated reaction vessel while ammoniating the solution from pH 6.1 to 8.4. In test 9C, the temperature was controlled in the range 15° to 20° C. by cooling the reaction vessel in a chilled water bath.

The results, summarized in Table XIII below, show that ammoniation temperatures in the range likely to be encountered in plant-scale operation had no effect on the distribution of phosphate species in the slurries. In carrying out this step of our process, therefore, it is not necessary to have rigid temperature control during the second ammoniation step.

TABLE XIII.—EFFECT OF TEMPERATURE, EXAMPLE XII

| | Starting acid | Starting solution | Ammoniated slurries | | |
|---|---|---|---|---|---|
| | | | 9A | 9B | 9C |
| Ammoniation temp., °C.: | | | | | |
| Initial | | | 72 | 64 | 27 | 15 |
| Maximal | | | 72 | 64 | 54 | 20 |
| Terminal | | | 72 | 44 | 46 | 19 |
| Final pH | | 6.1 | 8.4 | 8.4 | 8.5 |
| Composition, percent: | | | | | |
| N | | | 11.3 | 14.2 | 15.5 | 13.7 |
| $P_2O_5$ | 79.6 | 37.6 | 38.8 | 37.4 | 36.2 |
| Distribution, percent of $P_2O_5$: | | | | | |
| Ortho | 21 | 23 | 25 | 24 | 23 |
| Pyro | 44 | 41 | 37 | 39 | 39 |
| Tripoly | 21 | 22 | 23 | 23 | 23 |
| Tetrapoly | 10 | 9 | 8 | 9 | 9 |
| Pentapoly | 3 | 4 | 3 | 3 | 3 |
| Other | 1 | 1 | 4 | 2 | |

EXAMPLE XIII

In another series of tests of modification I, portions of a slurry were granulated and dried to determine the effect of drying temperature on the composition and distribution of phosphate species in the granular products.

The slurry was prepared by batch ammoniation of 600 grams of freshly prepared hot stock solution as described for test 9A in Example XII. The slurry was centrifuged, and the liquid and solid phases were granulated by the procedure described in Example X using three parts dry solid and one part liquid; the moist granules then were dried at 66°, 82°, or 105° C. In each test, three granulation and drying operations were necessary to reconstitute the starting slurry. The composition of the starting materials and the granular products are shown in Table XIV below.

TABLE XIV.—PREPARATION OF GRANULES, EXAMPLE XIII

| | Starting acid | Starting solution | Slurry 9A | Granulated products | | |
|---|---|---|---|---|---|---|
| | | | | 9A-1 | 9A-2 | 9A-3 |
| Drying temp., ° C | | | | 66 | 82 | 105 |
| Composition, percent: | | | | | | |
| N | | 11.3 | 14.2 | 18.7 | 18.2 | 18.5 |
| $P_2O_5$ | 79.6 | 37.6 | 38.8 | 59.0 | 59.5 | 59.1 |
| Free $H_2O$ | | | | 0.4 | 0.6 | 0.6 |
| Distribution, percent of $P_2O_5$: | | | | | | |
| Ortho | 21 | 23 | 25 | 25 | 27 | 37 |
| Pyro | 44 | 41 | 37 | 45 | 53 | 60 |
| Tripoly | 21 | 22 | 23 | 28 | 19 | |
| Tetrapoly | 10 | 9 | 8 | | | |
| Pentapoly | 3 | 4 | 3 | | | |
| Other | 1 | 1 | 4 | 2 | 1 | 3 |

The results show that drying temperatures in the range 66° to 105° C. had no significant effect on the N and $P_2O_5$ contents of the granular products. The drying temperature, however, did affect significantly the distribution of phosphate species in the products. In the starting slurry, 38 percent of the $P_2O_5$ was present in phosphate forms more condensed than pyrophosphate. After granulation and drying at 66°, 82°, or 105° C., the $P_2O_5$ present in the more condensed forms was decreased to 30, 20, and 3 percent, respectively. Moreover the $P_2O_5$ present in the more desirable pyrophosphate form increased from 45 to 53 or to 60 percent when the drying temperature was raised from 66° to 82° or to 105° C., respectively.

EXAMPLE XIV

Concentrated wet-process acid was used in another test of modification I of our process to determine the feasibility of using relatively impure commercial superphosphoric acid in the production of grannular ammonium polyphosphate for use as a fertilizer. The acid (CWA–15) had been concentrated thermally to a $P_2O_5$ content of 70.9 percent from "black" commercial wet-process acid (52 percent $P_2O_5$) produced from uncalcined Florida phosphate rock; it contained 2.2 percent $Fe_2O_3$, 1.5 percent $Al_2O_3$, 3.2 percent $SO_3$, 0.5 percent F. The $P_2O_5$ of the concentrated acid was distributed as ortho- 55, pyro- 37, tripoly- and longer-chain phosphates 8 percent.

In the test, the black acid was combined with water and anhydrous ammonia as shown schematically in FIGURE 2. The temperature was controlled in the range 50° to 60° C., and the pH was maintained at about 5 while producing continuously a stock solution that contained 9.0 percent N and 36.6 percent $P_2O_5$. A 500-g. batch of the stock solution in an insulated vessel fitted with a stirrer then was treated with anhydrous ammonia to a pH of 8.6; the temperature during the batch ammoniation rose from 31° to 77° C. The resultant slurry (497 g.) contained 14.1 percent N and 36.7 percent $P_2O_5$.

The slurry was granulated by the procedure described in Example X using 4 recycle steps; 5 parts of dried solids were mixed with 1 part of the liquid phase in each granulation cycle. The final granular product contained 17.5 percent N, and 52.8 percent $P_2O_5$, with the $P_2O_5$ distributed as ortho- 56, pyro- 39, tripoly- and long-chain phosphates 5 percent, the same distribution, within experimental error, as that in the starting wet-process acid. According to two standard analytical procedures, the granules were 100 percent available by the neutral ammonium citrate test and 99.4 percent available by the alkaline citrate test. The granular product had good physical properties, remaining dry and free-flowing after extended periods of storage.

EXAMPLE XV

In one test of modification II of our process, illustrated in FIGURE 4, electric furnace superphosphoric acid (83.4 percent $P_2O_5$) at 70° C., water, and anhydrous ammonia were combined continuously at pH about 0.2 to form a solution that contained 6.0 percent N and 48.4 percent $P_2O_5$. In this first ammoniation step, the temperature of the solution was maintained at about 70° C. by means of cooling coils. In the second step, ammonia was added batchwise to the solution to pH 5.9, and water was added at the start and at the end to adjust the $P_2O_5$ content to about 42 percent. The second ammoniation step was done without refrigeration, and the temperature of the solution was about 90° C. In the third step, the solution at pH 5.9 was treated with ammonia in a batch operation to pH 8.6. The third ammoniation step was done without refrigeration, and the temperature of the slurry was about 70° C.; water was added to replace that evaporated. The slurry was centrifuged, the solution phase was decanted, and the moist solids were dried at 66° C. The dry solids were crushed to pass a 12-mesh screen, and the fines were mixed with the reserved solution phase in the ratio of 3 parts fines to 1 part solution. The moist granules (about 8 percent $H_2O$) then were dried at 66° C. The granular product (0.6 percent free $H_2O$) had good physical properties, and contained 18.2 percent N and 58.4 percent $P_2O_5$ with the $P_2O_5$ distributed about equally among the ortho-, pyro- and tripolyphosphate species. The results are summarized in Table XV below.

TABLE XV.—AMMONIATION OF SUPERPHOSPHORIC ACID (115 PERCENT $H_3PO_4$)

| | Starting acid | Ammoniation | | | Granulation |
|---|---|---|---|---|---|
| | | Stage 1 | Stage 2 | Stage 3 | |
| Operation | | Contin. | Batch | Batch | Batch |
| Product | | Soln. | Soln. | Slurry | Granules |
| pH: | | | | | |
| Initial | | 0.2 | 0.2 | 5.9 | |
| Final | | 0.2 | 5.9 | 8.6 | |
| Temp., ° C.: | | | | | |
| Initial | | 70 | 38 | 58 | |
| Max | 70 | 72 | 92 | 72 | 66 |
| Final | | 71 | 92 | 53 | |
| Time, min | | 37 | 36 | 43 | |
| Product—Compn., percent: | | | | | |
| N | | 6.0 | 12 | 14.6 | 18.2 |
| $P_2O_5$ | 83.4 | 48.4 | 42 | 39.7 | 58.4 |
| Lb. $NH_3$/unit $P_2O_5$ | | 3.0 | 7.0 | 8.9 | 7.6 |
| Distribution, percent of $P_2O_5$: | | | | | |
| Ortho | 5 | 24 | 35 | 34 | 37 |
| Pyro | 15 | 28 | 31 | 29 | 32 |
| Tri | 15 | 18 | 19 | 22 | 29 |
| Tetra | 14 | 15 | 8 | 10 | |
| Penta | 12 | 7 | 4 | 3 | |
| Other | 39 | 8 | 3 | 2 | 2 |

The fraction of the phosphorus present in forms more condensed than tripolyphosphate decreased from about 65 to 15 percent during the first two stages of ammoniation, but there was no further hydrolysis in the third stage. Further hydrolysis occurred, however, during granulation. The phosphorus present as tetrapolyphosphate and longer-chain species decreased from 15 percent in the slurry to 2 percent in the dry granular product.

In the development of this procedure of modification II of our process, the temperature and pH at which the concentrated acid (>80 percent $P_2O_5$) was ammoniated initially were found to be critical in controlling the desired hydrolysis reactions. In an exploratory test, for example, the concentrated acid (83.4 percent $P_2O_5$), water, and ammonia were combined under the conditions (70° C. and pH 5.8) that are used commercially to produce 11-37-0 solution from less concentrated acid (about 78 percent $P_2O_5$). This hot solution then was treated with anhydrous ammonia to pH 9.6; no precipitation occurred, in contrast to tests in which the intermediate solution (11-37-0) prepared from less concentrated acids (<80 percent $P_2O_5$) were used. In another exploratory test, the same conditions were used except that the initial ammoniation was carried out at pH 4. The final ammoniation was stopped at pH 9.6 as before. The product was a milky liquid that became a white viscous gel on standing a few days. About two-thirds of the phosphorus in the concentrated acid (83.4 percent $P_2O_5$) that was used in these tests is more highly condensed than tripolyphosphate. In the exploratory tests, the long-chain species were not hydrolyzed rapidly enough to form sufficient amounts of ortho-, pyro-, and tripolyphosphates for precipitation.

at 125° or 150° C. after start of the water vapor. The rates of addition of ammonia and of water vapor ranged from 0.3 to 1.1 grams $NH_3$/min. and from 0.16 to 0.32 grams $H_2O$/min.

Results of several typical tests are summarized in Table XVI below.

TABLE XVI.—AMMONIATION AND HYDROLYSIS OF SUPERPHOSPHORIC ACID (83.1 PERCENT $P_2O_5$)

| | | Ammoniation | | | Water added | | Product | | | | | | |
|---|---|---|---|---|---|---|---|---|---|---|---|---|---|
| | | | | | | | Compn., percent | | | Distribution, percent of $P_2O_5$ | | | |
| No. | Temp., °C. | Time, min. | pH | Rate, g. $NH_3$/min. | Percent[1] | Rate, g./min. | N | $P_2O_5$ | g. $NH_3$/ 20 g. $P_2O_5$ | Ortho | Pyro | Tri | Other |
| Acid [1] | | | | | | | | 83.1 | | 6.7 | 18.0 | 17.0 | [2] 58.3 |
| | | | | | Water added at start of ammoniation | | | | | | | | |
| 19A | 125 | 16<br>31<br>[3] 58<br>70 | 1.0<br>2.1<br>5.5<br>5.8 | 0.65 | 200 | 0.16 | 7.4<br>11.9<br>15.8<br>16.3 | 74.4<br>69.2<br>64.1<br>62.8 | 2.4<br>4.2<br>6.0<br>6.3 | 10<br>12<br>15<br>6 | 23<br>26<br>43<br>74 | 19<br>22<br>28<br>12 | 48<br>40<br>4<br>3 |
| 22 | 125 | 10<br>20<br>30<br>[3] 36<br>49<br>55 | 1.0<br>2.5<br>4.8<br>5.2<br>5.7<br>5.7 | 1.1 | 200 | 0.27 | 7.3<br>12.6<br>14.8<br>15.6<br><br>16.3 | 74.7<br>68.1<br>65.9<br>64.6<br><br>62.9 | 2.4<br>4.5<br>5.5<br>5.9<br><br>6.3 | 10<br>13<br>14<br>14<br>14<br>7 | 24<br>31<br>39<br>42<br>45<br>81 | 19<br>24<br>27<br>27<br>28<br>6 | 47<br>32<br>20<br>7<br>13<br>4 |
| | | | | | Water added after ammoniation started | | | | | | | | |
| 23 | 150 | 15<br>[4] 26<br>56<br>[3] 73 | 0.7<br>1.0<br>4.8<br>5.5 | 0.48 | 300 | 0.32 | <br>8.5<br>14.9<br>16.5 | <br>74.5<br>66.0<br>63.9 | <br>2.8<br>5.5<br>6.3 | 5<br>6<br>11<br>12 | 15<br>14<br>34<br>42 | 15<br>14<br>28<br>30 | 65<br>66<br>27<br>16 |
| 30 | [5] 125 | 82<br>[4] 10<br>25<br>50<br>[3] 56 | 5.6<br>0.4<br>1.3<br>5.3<br>5.6 | 0.53 | 300 | 0.30 | 16.6<br><br>9.3<br>15.7<br>16.4 | 62.7<br><br>71.2<br>62.5<br>62.0 | 6.4<br><br>3.2<br>6.1<br>6.4 | 4<br>7<br>14<br>27<br>27 | 75<br>15<br>28<br>49<br>69 | 10<br>15<br>22<br>19<br>3 | 11<br>63<br>36<br>5<br>1 |

[1] 100% is the amount, 4.5 grams $H_2O$/100 grams acid, required to hydrolyze all higher species to pyrophosphate; about 100 grams of acid used in each test.
[2] Tetra 15.1, penta 12.2, hexa 9.9, hepta 8.2, octa and higher 12.9%.
[3] Water stopped.
[4] Water started.
[5] Temperature rose from 150° to 200° C. during initial 10 minutes of ammoniation; mixture cooled to 125° C. before addition of water.

EXAMPLE XVI

A series of tests was made of the alternate procedure of modification II, as generally illustrated in FIGURE 5, to determine the effects of temperature and rates of water and ammonia additions on the hydrolysis of superphosphoric acids in the formation of melts with pyrophosphate contents significantly higher than in the starting acid. Most of the tests were made with 115 percent superphosphoric acid (83.1 percent $P_2O_5$, distributed as ortho- 7, pyro- 18, and longer-chain phosphates 75 percent).

Batches of the acid (100 grams), preheated to the desired reaction temperature in an open container, were treated with gaseous ammonia and water vapor. The vapors were introduced into the acid through sparger tubes; vigorous agitation was provided with a mechanical stirrer. The reaction temperatures in the range 125° to 200° C. were controlled within ±3° C. In some tests ammonia and water were added simultaneously from the beginning; in other tests the addition of water vapor was delayed until the acid had been ammoniated to about pH 1, and in other tests the addition of ammonia was continued after the addition of water vapor was stopped. Ammoniation was usually continued until the pH of the hot melt was about 5.5. The amount of water used was based on the theoretical requirement to hydrolyze to pyrophosphate all the species more condensed than $H_4P_2O_7$. For this particular acid (83.1 percent $P_2O_5$) the theoretical quantity was calculated to be 4.5 grams $H_2O$ per 100 grams of acid. However, excess water was used in most tests; preliminary experiments showed that the theoretical amount was insufficient to hydrolyze all the long-chain species, because of mechanical losses and the formation of an undetermined amount of hydrates. Most of the tests were carried out as 125° or 150° C. In some tests the initial ammoniation was done at 200° C., after which the reaction mixture was cooled to and controlled The results show that superphosphoric acid containing about 83 percent $P_2O_5$ can be ammoniated at atmospheric pressure and hydrolyzed under specified conditions to produce ammonium polyphosphate in which the distribution of phosphate species can be controlled within wide limits. For example, the solidified melts contained 69 to 81 percent pyrophosphate, an increase in this desirable component of about 400 percent over that in the starting acid; the orthophosphate content ranged from about 6 percent (same as in the starting acid) to 27 percent. The products also contained 4 to 21 percent of phosphates more condensed than pyrophosphate, which corresponds to a 4- to 19-fold decrease of these species over the total amount (75 percent) in the starting acid. These products with grades of about 16–63–0 had good physical properties.

EXAMPLE XVII

Other tests of the alternate procedure of modification II illustrated in FIGURE 5 were made with (1) electric-furnace acid containing 79.6 percent $P_2O_5$, distributed as 25 percent ortho-, 39 percent pyro-, 20 percent tripoly-, and 16 percent longer-chain phosphates, and (2) concentrated wet-process acid containing 73.5 percent $P_2O_5$, distributed as 49 percent ortho-, 42 percent pyro-, 7 percent tripoly-, and 2 percent longer-chain phosphates. In these tests the acids were heated to and maintained at 200° C. while ammoniating during the first 60-minute period to pH about 5, the hot mixture was cooled rapidly to 125° C. and maintained at this temperature while adding water vapor and ammonia simultaneously during the final 15- to 25-minute periods.

Results of two typical tests show that these acids also can be ammoniated at atmospheric pressure and hydrolyzed under specified conditions to produce ammonium polyphosphate with pyrophosphate contents significantly higher than that in the starting acids. The products containing about 6 grams $NH_3$ per grams $P_2O_5$ had good physical properties. The results are summarized in Table XVII below.

prepared from superphosphoric acid (83.1 percent $P_2O_5$) as described in test 22, Example XVI, except in this test

TABLE XVII.—AMMONIATION AND HYDROLYSIS OF SUPERPHOSPHORIC ACIDS

Acid I—Electric furnace, 79.6% $P_2O_5$
Acid II—Concentrated wet-process, 73.5% $P_2O_5$

| | | Ammoniation | | | Water added | | Product | | | | | | |
|---|---|---|---|---|---|---|---|---|---|---|---|---|---|
| | | | | Rate, g. $NH_3$/ min. | | | Compn., percent | | g. $NH_3$/ 20 g. $P_2O_5$ | Distribution, percent of $P_2O_5$ | | | |
| No. | Temp., °C. | Time, min. | pH | | g./100g. acid | Rate, g./min. | N | $P_2O_5$ | | Ortho | Pyro | Tri | Other |
| Acid I | | | | | | | | 79.6 | | 25.1 | 39.1 | 19.5 | [1] 16.3 |
| 35 | [2] 125 | 10 | 0.55 | 0.4 | 4.5 | 0.30 | | | | 23 | 36 | 21 | 20 |
| | | 30 | 2.7 | | | | | | | 21 | 37 | 22 | 20 |
| | | [3] 60 | 5.1 | | | | | | | 18 | 42 | 25 | 15 |
| | | [4] 75 | 5.3 | | | | 15.9 | 62.3 | 6.2 | 17 | 74 | 7 | 2 |
| Acid II | | | | | | | | 73.5 | | 49.5 | 41.7 | 6.9 | [5] 1.9 |
| 33 | [2] 125 | 10 | 0.85 | 0.4 | 7 | 0.26 | | | | 47 | 37 | 12 | 4 |
| | | 30 | 2.2 | | | | | | | 40 | 44 | 13 | 3 |
| | | [3] 60 | 5.5 | | | | | | | 33 | 52 | 12 | 3 |
| | | [4] 87 | 6.1 | | | | 16.4 | 58.2 | 6.8 | 39 | 58 | 2 | 1 |

[1] Tetra 9.4, penta 4.0, hexa 2.7, hepta and higher 0.2%.
[2] Acids heated to and maintained at 200° C. for initial 60 minutes of ammoniation; mixtures cooled to 125° C. before addition of water.
[3] Water started.
[4] Water stopped.
[5] Tetra 1.7, penta and higher 0.2%.

EXAMPLE XVIII

In a typical test of the granulation step shown as alternate route No. 1 in FIGURE 5, one part of melt (16.5 percent N, 64.1 percent $P_2O_5$; ortho- 14, pyro- 45, tripoly- 27, other long-chain phosphates 14 percent) and 4 parts of recycle (−12 mesh; 16.3 percent N, 62.9 percent $P_2O_5$; ortho- 7, pyro- 81, tripoly- 6, other long-chain phosphates 6 percent) were mixed mechanically with an amount of water corresponding to 3 percent by weight of mixture. The moist granules were heated 0.5 hour at 105° C. The hard granular product (product F) contained 16.4 percent N and 62.9 percent $P_2O_5$ distributed as ortho- 9, pyro- 84, tripoly- and other long-chain species 7 percent. The product had good physical properties.

In other tests, portions of a melt containing 11.1 percent N and 67.0 percent $P_2O_5$ were treated with various amounts of water and then ammoniated to form dry granular products with ratios of N to $P_2O_5$ higher than the ratios normally in granular products made from melt and recycle.

In the tests, the melt was cooled with stirring to about 75° C. in an ammonia atmosphere, and water was added to each of three portions of the cooled melt in amounts equivalent to 6.5, 13, and 27 grams per 100 grams of melt. The moist mixtures were stirred and ammoniated until dry.

The results show that the degree of ammoniation in the product increased as the amount of water added was increased. The degree of ammoniation was maximal (9 lb. $NH_3$/20 lb. $P_2O_5$) when the water added was in an amount equivalent to 27 grams per 100 grams of melt. The distributions of phosphate species in the products indicate that about 9 pounds $NH_3$ per unit of $P_2O_5$ is the maximum to be expected. These dry granular products had good physical properties. These results are given in Table XVIII below.

the temperature was maintained at 150° C. The melt, after cooling to about 80° C., was treated with water and ammonia to produce a slurry containing 15.2 percent N and 41.0 percent $P_2O_5$. During ammoniation to pH 8.3, the temperature decreased to about 50° C.

A portion of the slurry was granulated with recycle, as described in Example X, to produce product G. Another portion of the slurry was granulated with product G and the initial melt in the proportions of 1 part slurry, 2 parts product G, and 1 part of the reserved melt reheated to 140° C. The moist granules were then dried at 65° C. for 30 minutes to produce product H.

The compositions of the intermediate melt and slurry, and the granular products are given in Table XIX below. Both granular products had good physical properties.

TABLE XIX.—GRANULAR MATERIAL PRODUCED AS IN EXAMPLE XVIII

| Product | Compon., percent | | Distribution, percent of $P_2O_5$ | | | |
|---|---|---|---|---|---|---|
| | N | $P_2O_5$ | Ortho | Pyro | Tripoly | Other |
| Melt, pH 5.5 | 16.5 | 64.1 | 14 | 45 | 27 | 14 |
| Slurry, pH 8.3 | 15.3 | 41.0 | 13 | 57 | 20 | 10 |
| Granular product G | 20.6 | 57.1 | 13 | 58 | 21 | 8 |
| Granular product H | 19.6 | 58.8 | 12 | 62 | 18 | 8 |

EXAMPLE XX

A test of alternate No. 3 of modification II, illustrated in FIGURE 5, was made to produce from an intermediate melt a concentrated solution which would be stable at 0° C.

The melt at pH 5.4 was prepared from superphosphoric acid (83.1 percent $P_2O_5$) as described in test 22, Example XVI, except that in this test the temperature was maintained at 150° C. The melt, cooled to 25° C., was dissolved in water and stored at 0° C. for 16 days. The stable solution, product I, had a pH of 5 and contained

TABLE XVIII.—AMMONIATION AND GRANULATION OF AMMONIUM POLYPHOSPHATE MELT

| Test | Water added, g./100 g. melt | Product | | | | | | |
|---|---|---|---|---|---|---|---|---|
| | | Compn., percent | | Lb. $NH_3$/ 20 lb. $P_2O_5$ | Distribution, percent of $P_2O_5$ | | | |
| | | N | $P_2O_5$ | | Ortho | Pyro | Tripoly | Other |
| Untreated melt | | 11.1 | 67.0 | | 38 | 40 | 15 | 7 |
| 1 | 6.5 | 15.1 | 61.1 | 6.0 | 29 | 43 | 20 | 8 |
| 2 | 13 | 16.5 | 58.3 | 6.9 | 35 | 42 | 17 | 7 |
| 3 | 27 | 20.7 | 56.0 | 9.0 | 30 | 40 | 19 | 11 |

EXAMPLE XIX

A test of alternate No. 2 of modification II, illustrated in FIGURE 5, was made to produce from an intermediate melt a slurry for granulation. The melt at pH 5.5 was 10.5 percent N and 41.6 percent $P_2O_5$, distributed as ortho- 12, pyro- 69, tripoly- 13, and longer-chain phosphates 6 percent.

EXAMPLE XXI

A test of alternate No. 4 of modification II, illustrated in FIGURE 5, was made to produce a concentrated suspension from an intermediate melt.

The melt at pH 5.5 was prepared from superphosphoric acid (83.1 percent $P_2O_5$) as described in test 23, Example XVI. The melt, cooled to 25° C., was dissolved in 10 minutes at 80° C. in water to form a solution containing 45 percent $P_2O_5$. When cooled to 25° C., a suspension of fine crystals was formed with diammonium pyrophosphate as the major phase and triammonium pyro- and diammonium orthophosphates as minor phases. The suspension, product J-1, had a pH of 5.1; it contained 11.9 percent N and 45.0 percent $P_2O_5$, distributed as ortho- 4, pyro- 75, tripoly- 10, and longer-chain phosphates 11 percent; and it had a viscosity of 270 centipoises at 25° C.

This suspension (product J-1) was diluted with water to form another suspension, product J-2, that contained 10.6 percent N and 40.0 percent $P_2O_5$ and had a viscosity of 70 centipoises at 25° C.

Product J-2 was ammoniated to pH 6.1 to form another suspension, product J-3, which contained about 11 percent N and 39 percent $P_2O_5$, distributed as ortho- 7, pyro- 84, and tripoly- 5, and longer-chain phosphates 4 percent, and had a viscosity of 240 centipoises at 25° C.

EXAMPLE XXII

In other tests of modification II, an intermediate melt at pH 5.5 was prepared from superphosphoric acid (83.1 percent $P_2O_5$) as described in test 22 of Example XVI, except that in this preparation the temperature was maintained at 150° C. Portions of this melt then were mixed with ammonium bicarbonate and/or water in various ways to form (1) a granular product with a weight ratio of N to $P_2O_5$ higher than that in granular products prepared from melt plus recycle, (2) a concentrated solution stable at 0° C., or (3) a concentrated suspension.

In one test, 10 parts of the hot melt at pH 5.5 was reacted with 4 parts of ammonium bicarbonate, and then heated at 105° C. for 15 minutes. The product contained 18.7 percent N and 59.8 percent $P_2O_5$, distributed as ortho- 16, pyro- 62, tripoly- 18, and longer-chain phosphates 4 percent. This product with good physical properties has a degree of ammoniation 20 percent higher than that of product F, Example XVIII, that was made from melt plus recycle.

In another test, 10 parts of the melt and 2.3 parts of water were stirred together at 70° C. for 2 hours. Ammonium bicarbonate, 2 parts was added gradually and the mixture was stirred for 1 hour at about 50° C. The resultant thick slurry (about 45 percent $P_2O_5$) was then diluted with water (10 parts slurry to 1.25 parts water) and heated for 15 minutes at 70° C. to form a less viscous slurry with pH 6.2 that contained 13.3 percent N and 40.9 percent $P_2O_5$, distributed as ortho- 16, pyro- 74, and longer-chain phosphates 10 percent; it had a viscosity of about 1000 centipoises at 25° C.

This slurry (13–41–0) was stored at 0° C. for 6 days and then centrifuged at about 0° C. to separate the solution phase stable at 0° C. The solution contained 12.0 percent N and 38.8 percent $P_2O_5$, distributed as ortho- 19, pyro- 67, tripoly- 10, and longer-chain phosphate 4 percent.

While we have shown and described particular embodiments of our invention, modifications and variations thereof will occur to those skilled in the art. We wish it to be understood, therefore, that the appended claims are intended to cover such modifications and variations that are within the true scope and spirit of the invention.

What we claim as new and desire to secure by Letters Patent of the United States is:

1. An improved fully integrated continuous process for the production of solid and liquid ammonium polyphosphates which comprises the steps of (at atmosphere pressure):

(1) simultaneously introducing a stream of superphosphoric acid (about 76 to about 80 percent $P_2O_5$) and streams of anhydrous ammonia and water into a first reaction zone; therein rapidly and intimately mixing said streams; controlling the proportion of said superphosphoric acid and said anhydrous ammonia and water introduced into said first reaction zone such that the reaction product formed therein
        (a) is maintained in the temperature range of about 50° to about 80° C. (b) has a pH in the range from about 5 to about 7 and (c) contains more than about 33 weight percent (N+$P_2O_5$);
    (2) withdrawing a stream of the reaction product from said first reaction zone and introducing said withdrawn stream of reaction product into a second reaction zone together with a stream of anhydrous ammonia and a stream of makeup water added to adjust the viscosity and to maintain the water content of the mixture in the range of about 20 to about 47 percent; maintaining the temperature in said second reaction zone in the range from about 20° C. to about 70° C.; controlling the relative proportions of anhydrous ammonia and reaction product added to said second reaction zone to raise the pH therein to a range from about 7.4 to about 8.9, said pH adjustment sufficient to form in said second reaction zone a slurry which has a gross composition of more than about 45 weight percent total (N+$P_2O_5$), preferably more than about 50 weight percent total (N+$P_2O_5$); retaining said slurry in said second reaction zone for an average retention time in excess of about 5 minutes;
    (3) withdrawing a stream of said slurry from said secod reaction zone and separating the liquid phase from the solid phase;
    (4) subjecting said separated solid phase to granulation and drying operations and recovering therefrom a solid product which comprises substantially ammonium orthophosphate and ammonium pyrophosphate, and which contains by weight from about 17 to about 21 percent nitrogen and from about 52 to about 60 percent $P_2O_5$; and
    (5) recovering from said separating step the liquid phase as a liquid product containing by weight from about 9 to about 12 percent nitrogen and from about 29 to about 34 percent $P_2O_5$.

2. The process of claim 1 wherein the liquid phase recovered from the separating step is further treated with superphosphoric acids containing more than about 74 percent $P_2O_5$ in relative quantity sufficient to decrease its pH down to a range of about 4 to about 6 and to increase its $P_2O_5$ content up to a range by weight from about 29 to about 37 percent.

3. The process of claim 1 wherein the liquid phase recovered from the separating step is further treated by adding thereto superphosphoric acid containing by weight more than about 75 percent $P_2O_5$ in relative quantity sufficient to decrease its pH down to a range of about 4.0 to about 5.5; subsequently adding thereto anhydrous ammonia to bring the pH of said liquid phase back to a range of about 4.5 to about 7, resulting in a liquid product having by weight a nitrogen content in the range from about 10 to 13 and a $P_2O_5$ content of about 36 to 40.

4. The process of claim 1 wherein the liquid phase recovered from the separating step is recycled to said first reaction zone wherein recovered therefrom are its values of nitrogen and $P_2O_5$.

5. An improved fully integrated continuous process for the production of granular ammonium polyphosphate which comprises the steps of (at atmospheric pressure):

(1) simultaneously introducing a stream of superphosphoric acid (about 76 to about 80 percent $P_2O_5$) and streams of anhydrous ammonia and water into a first reaction zone; therein rapidly and intimately mixing said streams; controlling the proportion of said superphosphoric acid and said anhydrous ammonia and water introduced into said first reaction zone such that the reaction product formed therein (a) is maintained in the temperature range of about 50° to about 80° C., (b) has a pH in the range from about 5 to about 7, and (c) contains more than about 33 weight percent total $(N+P_2O_5)$;

(2) withdrawing a stream of the reaction product from said first reaction zone and introducing said withdrawn stream of reaction product into a second reaction zone, together with a stream of anhydrous ammonia and a stream of makeup water added to maintain the water content of the mixture in the range of about 20 to about 47 percent; maintaining the temperature in said second reaction zone in the range of about 50° to about 110° C.; controlling the relative proportions of anhydrous ammonia and reaction product added to said second reaction zone to raise the pH therein to within the range of about 7.4 to about 8.9, said pH adjustment sufficient to form in said second reaction zone a slurry containing more than about 45 weight percent total $(N+P_2O_5)$, preferably containing more than about 50 weight percent total $(N+P_2O_5)$;

(3) retaining said slurry in said second reaction zone for an average retention time in excess of about 5 minutes;

(4) withdrawing a stream of said slurry from said second reaction zone and introducing said stream of slurry directly to granulation and drying (temperature ranging from about 50° to 110° C.) operations and recovering therefrom a solid product containing by weight from about 17 percent to about 21 percent nitrogen and from about 52 percent to about 60 percent $P_2O_5$, and consisting of substantially ammonium orthophosphates, ammonium pyrophosphates, and ammonium tripolyphosphates.

No references cited.

EDWARD STERN, Primary Examiner

U.S. Cl. X.R.

71—43

PO-1050
(5/69)

UNITED STATES PATENT OFFICE
CERTIFICATE OF CORRECTION

Patent No. 3,484,192        Dated December 16, 1969

Inventor(s) Thad D. Farr, Henry K. Walters, Jr., and Julius D. Fleming

It is certified that error appears in the above-identified patent and that said Letters Patent are hereby corrected as shown below:

Column 2, line 63, change "state" to -- stage --.
Column 4, line 22, delete "principles of our process in modification I thereof," and substitute -- polyphosphates and a concentrated liquid each of --; line 32, change "inventioin" to -- invention --; line 37, change "avial-" to -- avail- --.
Column 5, line 17, change "rang" to -- range --.
Column 7, line 13, change "condenser" to -- condensed --.
Column 13, table II, the heading "Sample Sample No." should be -- Sample No. --.
Column 18, line 59, change "minum" to -- minus --.
Column 19, table XII, the heading "H$_2$O" should read -- Free H$_2$O --.
Column 20, table XIII, under column "9B" opposite "N" change "15.5" to -- 13.5 --; under column "9C" opposite "Other" insert -- 3 --.
Column 23, line 73, change "as" to -- at --.
Column 24, line 75, before "grams P$_2$O$_5$" insert -- 20 --.
Column 25, table XVIII, should read as follows: --

Table XVIII
Ammoniation and Granulation of Ammonium Polyphosphate Melt

| | | Product | | | | | |
|---|---|---|---|---|---|---|---|
| | Water added, | Compn., % | | Lb. NH$_3$/ | Distribution, %, of P$_2$O$_5$ | | |
| Test | g./100 g. melt | N | P$_2$O$_5$ | 20 lb.P$_2$O$_5$ | Ortho | Pyro | Tripoly | Other |
| | Untreated melt | 11.1 | 67.0 | - | 38 | 40 | 15 | 7 |
| 1 | 6.5 | 15.1 | 61.1 | 6.0 | 29 | 43 | 20 | 8 |
| 2 | 13 | 16.5 | 58.3 | 6.9 | 35 | 42 | 17 | 7 |
| 3 | 27 | 20.7 | 56.0 | 9.0 | 30 | 40 | 19 | 11 |

Column 26, table XIX, under the column "N" opposite "Slurry, pH 8.3" change "15.3" to -- 15.2 --.
Column 27, line 49, after "2 parts" add a comma.
Column 28, line 12, after "percent" insert -- total --.

SIGNED AND
SEALED
JUN 9 1970

(SEAL)
Attest:

Edward M. Fletcher, Jr.
Attesting Officer

WILLIAM E. SCHUYLER, JR.
Commissioner of Patents